US011374677B2

(12) United States Patent
Zhang et al.

(10) Patent No.: US 11,374,677 B2
(45) Date of Patent: Jun. 28, 2022

(54) SIGNALING OF HIGHER MODULATION ORDER BASEBAND CAPABILITY

(71) Applicant: QUALCOMM Incorporated, San Diego, CA (US)

(72) Inventors: Wenshu Zhang, San Diego, CA (US); Amir Farajidana, Sunnyvale, CA (US); Timothy Paul Pals, San Diego, CA (US); Alberto Rico Alvarino, San Diego, CA (US); Honey Kakkar, San Diego, CA (US); Parastoo Kheirkhah, San Diego, CA (US); Nitin Pant, San Diego, CA (US); Umesh Phuyal, San Diego, CA (US); Venkata Naga Aishwarya Reddy Kasa, San Diego, CA (US); Shashank Maiya, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 16/836,198

(22) Filed: Mar. 31, 2020

(65) Prior Publication Data
US 2020/0328839 A1    Oct. 15, 2020

Related U.S. Application Data

(60) Provisional application No. 62/833,618, filed on Apr. 12, 2019.

(51) Int. Cl.
*H04L 1/00* (2006.01)
*H04L 27/00* (2006.01)
(Continued)

(52) U.S. Cl.
CPC .......... *H04L 1/0003* (2013.01); *H04L 1/0009* (2013.01); *H04L 1/0016* (2013.01);
(Continued)

(58) Field of Classification Search
None
See application file for complete search history.

(56) References Cited

U.S. PATENT DOCUMENTS 10,979,988 B2 * 4/2021 Nimbalker ........ H04W 72/1289
2020/0266928 A1 * 8/2020 Yeo ....................... H04L 5/0092
(Continued)

OTHER PUBLICATIONS

"3rd Generation Partnership Project, Technical Specification Group Radio Access Network, Evolved Universal Terrestrial Radio Access (E-UTRA), Radio Resource Control (RRC), Protocol specification (Release 15)", 3GPP Standard, Technical Specification, 3GPP TS 36.331, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 4, 2019 (Apr. 4, 2019), pp. 1-948, XP051723301, [retrieved on Apr. 4, 2019] Section 5.6.3 p. 646-p. 704.
(Continued)

*Primary Examiner* — Otis L Thompson, Jr.
(74) *Attorney, Agent, or Firm* — Holland & Hart LLP/Qualcomm Incorporated

(57) ABSTRACT

Methods, systems, and devices for wireless communications are described. More specifically, the methods, systems, and devices support extending capability signaling to support higher modulation order baseband capability, such as higher order quadrature amplitude modulation (QAM), for example, 1024QAM. By way of example, a user equipment (UE) may transmit UE capability information to a base station (e.g., eNodeB (eNB), next-generation NodeB ((gNB)) in a connection establishment procedure. The UE capability information may include a UE category identifier and a baseband capability parameter. The baseband capability parameter may indicate a scaling factor for a first modulation order of a plurality of available modulation
(Continued)

orders. The UE may communicate with the base station over multiple layers using corresponding modulation orders for the multiple layers.

23 Claims, 14 Drawing Sheets

(51) Int. Cl.
    *H04L 27/34* (2006.01)
    *H04W 72/04* (2009.01)
(52) U.S. Cl.
    CPC ........ *H04L 1/0025* (2013.01); *H04L 27/0008* (2013.01); *H04L 27/34* (2013.01); *H04W 72/042* (2013.01)

(56) References Cited

U.S. PATENT DOCUMENTS

| | | | |
|---|---|---|---|
| 2020/0267648 A1* | 8/2020 | Kim | H04L 5/001 |
| 2020/0359199 A1* | 11/2020 | Takahashi | H04L 5/001 |
| 2020/0383066 A1* | 12/2020 | Gutierrez | H04W 24/10 |
| 2021/0337466 A1* | 10/2021 | Zou | H04W 60/06 |

OTHER PUBLICATIONS

"3rd Generation Partnership Project, Technical Specification Group Radio Access Network, NR, User Equipment (UE) Radio Access Capabilities (Release 15)", 3GPP Standard, Technical Specification, 3GPP TS 38.306, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 11, 2019 (Apr. 11, 2019), pp. 1-49, XP051723403, [retrieved on Apr. 11, 2019] Section 4.1; p. 30.
"3rd Generation Partnership Project, Technical Specification Group Radio Access Network, Evolved Universal Terrestrial Radio Access (E-UTRA), User Equipment (UE) Radio Access Capabilities (Release 15)", 3GPP Draft, Draft_36.306-F40 V2, 3rd Generation Partnership Project (3GPP), Mobile Competence Centre, 650, Route Des Lucioles, F-06921 Sophia-Antipolis Cedex, France, vol. RAN WG2, No. 20190301 Apr. 9, 2019 (Apr. 9, 2019), XP051709591, 119 pages, Retrieved from the Internet: URL: http://www.3gpp.org/ftp/tsg%5Fran/WG2%5FRL2/Specifications/201903%5Fdraft%5Fspecs%5Fafter%5FRAN%5F83/Draft%5F36306%2Df40%5Fv2%2Ezip. [retrieved on Apr. 9, 2019] Sections 4, 4.1 A, 4.3.5.31.
"3rd Generation Partnership Project; Technical Specification Group Radio Access Network; NR; Radio Resource Control (RRC) protocol specification (Release 15)", 3GPP Standard, Technical Specification, 3GPP TS 38.331, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 4, 2019 (Apr. 4, 2019), pp. 1-489, XP051723314, [retrieved on Apr. 4, 2019] p. 377.
Intel Corporation: "Discussion on L1 Data Rate", 3GPP Draft, R1-1804682, Intel L1 Data Rate, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018, Apr. 15, 2018 (Apr. 15, 2018), XP051426949, 4 Pages, Retrieved from the Internet: URL: http://www.3gpp.org/ftp/Meetings%5F3GPP%5FSYNC/RAN1/Docs/. [retrieved on Apr. 15, 2018] Sections 1-2.
International Search Report and Written Opinion—PCT/US2020/026109—ISA/EPO—dated Jun. 15, 2020.
Nokia., et al., "UE Capabilities for CHO", 3GPP Draft, R2-1913015, UE Capabilities for CHO, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14,, 2019-Oct. 18, 2019, Oct. 3, 2019 (Oct. 3, 2019), XP051791042, 69 Pages, Retrieved from the Internet: URL: http://www.3gpp.org/ftp/tsg_ran/WG2_RL2/TSGR2_107bis/Docs/R2-1913015.zip—[retrieved on Oct. 3, 2019] p. 43.
Qualcomm Incorporated: "Capabilities for 1024QAM", 3GPP Draft, R1-1907112 Capabilities for 1024QAM, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051709141, 3 Pages, Retrieved from the Internet: URL: http://www.3gpp.org/ftpjtsg%5Fran/WG1%5FRL1/TSGR1%5F97/Docs/R1%2D1907112%2Ezip. [retrieved on May 4, 2019] Sections 1-2.
Qualcomm Incorporated [RAN1]: "LS on LTE Capabilities for FD-MIMO and 1024QAM", 3GPP Draft, R1-1907614 Draft LS on LTE Capabilities for FD-MIMO and 1024QAM, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 16, 2019 (May 16, 2019), XP051739916, 2 Pages, Retrieved from the Internet: URL: http://www.3gpp.org/ftp/tsg%5Fran/WG1%5FRL1/TSGR1%5F97/Docs/R1%2D1907614%2Ezip. [retrieved on May 16, 2019] Section 1.2.
RAN1: "LS on LTE Capabilities for FD-MIMO and 1024QAM", 3GPP Draft, R2-1908429, R1-1907628, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, May 13, 2019-May 17, 2019, May 16, 2019 (May 16, 2019), XP051731491, 2 Pages, Retrieved from the Internet: URL: http://www.3gpp.org/ftp/Meetings%5F3GPP%5FSYNC/RAN2/LSin/R2%2D1908429%2Ezip. [retrieved on May 16, 2019] Section 1.2.

\* cited by examiner

| Carrier Aggregation 310 | 1A 325-a | 3C 325-b | 7C 325-c | 28A 325-d |
|---|---|---|---|---|
| MIMO 315 | 4 | 4-4 | 4-4 | 4 |
| DL1024QAM 320 | - | - | - | - |

| Carrier Aggregation 310 | 1A 325-e | 3C 325-f | 7C 325-g | 28A 325-h |
|---|---|---|---|---|
| MIMO 315 | 2 | 4-4 | 4-4 | 2 |
| DL1024QAM 320 | X | X | X | X |

SIGNALING OF HIGHER MODULATION ORDER BASEBAND CAPABILITY

CROSS REFERENCE

The present application for patent claims the benefit of U.S. Provisional Patent Application No. 62/833,618 by ZHANG et al., entitled "SIGNALING OF HIGHER MODULATION ORDER BASEBAND CAPABILITY," filed Apr. 12, 2019, assigned to the assignee hereof, and expressly incorporated by reference herein.

BACKGROUND

The following relates generally to wireless communications, and more specifically to signaling of higher modulation order baseband capability.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations (e.g., eNodeBs (eNBs), next-generation NodeBs ((gNBs)), each simultaneously supporting communication for multiple communication devices, which may be otherwise known as user equipments (UEs). Some wireless communications systems may include features that may be dependent upon one or more UE capability parameters that are reported by the UEs to the base stations. As demand for efficient wireless communication increases, a wireless communications system may support methods for improving UE capability parameter signaling.

SUMMARY

The described techniques relate to improved methods, systems, devices, and apparatuses that support signaling of higher modulation order baseband capability. Generally, the described techniques provide for enabling user equipments (UEs) to extend capability signaling to support higher modulation order baseband capability, such as higher order quadrature amplitude modulation (QAM), for example, 1024QAM. The described techniques may support higher modulation order capability signaling by extending UE capability parameter signaling to include a UE category identifier and a baseband capability parameter. The baseband capability parameter may indicate a processing capability of UEs related to a number of layers, a modulation order, a data rate, and the like. The UE category identifier may map to a range for a maximum data rate and the baseband capability parameter may include a maximum supported data rate within the range for the maximum data rate. By extending capability signaling to support higher modulation order baseband capability, UEs may have a mechanism for efficient signaling of 1024QAM capabilities across multiple band combinations.

A method of wireless communications at a UE is described. The method may include transmitting UE capability information to a base station in a connection establishment procedure, the UE capability information including a UE category identifier and a baseband capability parameter, the baseband capability parameter indicating a scaling factor for a first modulation order of a plurality of available modulation orders, and communicating with the base station over a plurality of layers using corresponding modulation orders for the plurality of layers.

An apparatus for wireless communications is described. The apparatus may include a processor, memory in electronic communication with the processor, and instructions stored in the memory. The instructions may be executable by the processor to cause the apparatus to transmit UE capability information to a base station in a connection establishment procedure, the UE capability information including a UE category identifier and a baseband capability parameter, the baseband capability indicating a scaling factor for a first modulation order of a plurality of available modulation orders, and communicate with the base station over a plurality of layers using corresponding modulation orders for the plurality of layers.

Another apparatus for wireless communications is described. The apparatus may include means for transmitting UE capability information to a base station in a connection establishment procedure, the UE capability information including a UE category identifier and a baseband capability parameter, the baseband capability parameter indicating a scaling factor for a first modulation order of a plurality of available modulation orders, and communicating with the base station over a plurality of layers using corresponding modulation orders for the plurality of layers.

A non-transitory computer-readable medium storing code for wireless communications at a UE is described. The code may include instructions executable by a processor to transmit UE capability information to a base station in a connection establishment procedure, the UE capability information including a UE category identifier and a baseband capability parameter, the baseband capability parameter indicating a scaling factor for a first modulation order of a plurality of available modulation orders, and communicate with the base station over a plurality of layers using corresponding modulation orders for the plurality of layers.

In some examples of the method, apparatuses, and non-transitory computer-readable medium described herein, the UE category identifier may be associated with a range for a maximum data rate, and where the baseband capability parameter further includes a maximum supported data rate within the range for the maximum data rate.

In some examples of the method, apparatuses, and non-transitory computer-readable medium described herein, the baseband capability parameter further comprises a total number of supported layers.

In some examples of the method, apparatuses, and non-transitory computer-readable medium described herein, the baseband capability parameter includes a number of layers for which a first modulation order may be supported.

In some examples of the method, apparatuses, and non-transitory computer-readable medium described herein, the communicating includes communicating over a first number of layers of the first modulation order and a second number of layers of other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor. In some of the examples of the method, apparatuses, and non-transitory computer-readable medium described herein, the baseband capability parameter comprises the scaling factor, x, and a total number of supported layers, y, and wherein a capability of the UE is given by $x \cdot \text{Num}_{Layers,1024QAM} + \text{Num}_{Layers,non1024QAM} \leq y$ where Num_(Layers,1024QAM) comprises a total number of layers for 1024QAM across all component carriers supported by the UE and Num_(Layers,non1024QAM) comprises a total number of downlink layers for other modulation orders across all carriers supported by the UE.

In some examples of the method, apparatuses, and non-transitory computer-readable medium described herein, the UE capability information includes one or more carrier aggregation combination entries, and where each carrier aggregation combination entry corresponds to a unique combination of composite carrier band indicators and numbers of supported layers for each component carrier for each composite carrier band indicator, and where each composite carrier band indicator includes a carrier band and band class.

In some examples of the method, apparatuses, and non-transitory computer-readable medium described herein, the UE capability information includes a set of carrier aggregation combination entries, and where each carrier aggregation combination entry may be associated with a corresponding baseband capability parameter.

In some examples of the method, apparatuses, and non-transitory computer-readable medium described herein, the UE capability information includes a first carrier aggregation combination entry associated with a first band combination including a first set of bands associated with a first protocol and a second set of bands associated with a second protocol, the first carrier aggregation combination entry including a first baseband capability parameter associated with the first protocol and a second baseband capability parameter associated with the second protocol.

In some examples of the method, apparatuses, and non-transitory computer-readable medium described herein, the UE capability information includes a second carrier aggregation combination entry associated with the first band combination, the first carrier aggregation combination entry including a third baseband capability parameter associated with the first protocol and a fourth baseband capability parameter associated with the second protocol.

In some examples of the method, apparatuses, and non-transitory computer-readable medium described herein, the first baseband capability parameter corresponds to a protocol dependent baseband support associated with the first protocol and the second baseband capability parameter corresponds to a maximum supported data rate, a weighting factor for a first modulation order of a set of available modulation orders and a total number of supported layers, or a number of layers for which the first modulation order may be supported.

In some examples of the method, apparatuses, and non-transitory computer-readable medium described herein, the UE capability information comprises a set of carrier aggregation combination entries, and wherein each carrier aggregation combination entry is associated with a corresponding baseband capability parameter. In some examples of the method, apparatuses, and non-transitory computer-readable medium described herein, the UE capability information comprises a first carrier aggregation combination entry associated with a first band combination including a first set of bands associated with a first protocol and a second set of bands associated with a second protocol, the first carrier aggregation combination entry including a first baseband capability parameter associated with the first protocol. In some examples of the method, apparatuses, and non-transitory computer-readable medium described herein, the first baseband capability parameter associated with the first protocol corresponds to a total number of weighted layers supported at the UE for the first protocol.

A method of wireless communications at a base station is described. The method may include receiving, from a UE in a connection establishment procedure, UE capability information including a UE category identifier and a baseband capability parameter, the baseband capability parameter indicating a scaling factor for a first modulation order of a plurality of available modulation orders, determining, based on the baseband capability parameter, a set of layers and corresponding modulation orders for the set of layers for communication with the UE over one or more carriers, and communicating with the UE over the plurality of layers using corresponding modulation orders.

An apparatus for wireless communications is described. The apparatus may include a processor, memory in electronic communication with the processor, and instructions stored in the memory. The instructions may be executable by the processor to cause the apparatus to receive, from a UE in a connection establishment procedure, UE capability information including a UE category identifier and a baseband capability parameter, the baseband capability parameter indicating a scaling factor for a first modulation order of a plurality of available modulation orders, determine, based on the baseband capability parameter, a set of layers and corresponding modulation orders for the set of layers for communication with the UE over one or more carriers, and communicate with the UE over the plurality of layers using corresponding modulation orders.

Another apparatus for wireless communications is described. The apparatus may include means for receiving, from a UE in a connection establishment procedure, UE capability information including a UE category identifier and a baseband capability parameter, the baseband capability parameter indicating a scaling factor for a first modulation order of a plurality of available modulation orders, determining, based on the baseband capability parameter, a set of layers and corresponding modulation orders for the set of layers for communication with the UE over one or more carriers, and communicating with the UE over the plurality of layers using corresponding modulation orders.

A non-transitory computer-readable medium storing code for wireless communications at a base station is described. The code may include instructions executable by a processor to receive, from a UE in a connection establishment procedure, UE capability information including a UE category identifier and a baseband capability parameter, the baseband capability parameter indicating a scaling factor for a first modulation order of a plurality of available modulation orders, determine, based on the baseband capability parameter, a set of layers and corresponding modulation orders for the set of layers for communication with the UE over one or more carriers, and communicate with the UE over the plurality of layers using corresponding modulation orders.

In some examples of the method, apparatuses, and non-transitory computer-readable medium described herein, the UE category identifier may be associated with a range for a maximum data rate, and where the baseband capability parameter further includes a maximum supported data rate within the range for the maximum data rate.

In some examples of the method, apparatuses, and non-transitory computer-readable medium described herein, the communicating includes communicating over a first number of layers of the first modulation order and a second number of layers of other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor. In some of the examples of the method, apparatuses, and non-transitory computer-readable medium described herein, the baseband capability parameter comprises the scaling factor, x, and a total number of supported layers, y, and wherein a capability of the UE is given by $x \cdot \text{Num}_{Layers, 1024QAM} + \text{Num}_{Layers, non1024QAM} \leq y$ where Num_(Layers,1024QAM) comprises a total number of layers for 1024QAM across all component carriers supported by the UE and Num_(Layers,non1024QAM) comprises a total number of downlink layers for other modulation orders across all carriers supported by the UE.

In some examples of the method, apparatuses, and non-transitory computer-readable medium described herein, the baseband capability parameter includes a total number of supported layers.

In some examples of the method, apparatuses, and non-transitory computer-readable medium described herein, the baseband capability parameter includes a number of layers for which a first modulation order may be supported.

In some examples of the method, apparatuses, and non-transitory computer-readable medium described herein, the UE capability information includes one or more carrier aggregation combination entries, and where each carrier aggregation combination entry corresponds to a unique combination of composite carrier band indicators and numbers of supported layers for each composite carrier band indicator, and where each composite carrier band indicator includes a carrier band and band class.

In some examples of the method, apparatuses, and non-transitory computer-readable medium described herein, the UE capability information includes a set of carrier aggregation combination entries, and where each carrier aggregation combination entry may be associated with a corresponding baseband capability parameter.

In some examples of the method, apparatuses, and non-transitory computer-readable medium described herein, the UE capability information includes a first carrier aggregation combination entry associated with a first band combination including a first set of bands associated with a first protocol and a second set of bands associated with a second protocol, the first carrier aggregation combination entry including a first baseband capability parameter associated with the first protocol.

In some examples of the method, apparatuses, and non-transitory computer-readable medium described herein, the UE capability information includes a second carrier aggregation combination entry associated with the first band combination, the first carrier aggregation combination entry including a third baseband capability parameter associated with the first protocol and a fourth baseband capability parameter associated with the second protocol.

In some examples of the method, apparatuses, and non-transitory computer-readable medium described herein, the first baseband capability parameter corresponds to a protocol dependent baseband support associated with the first protocol and the second baseband capability parameter corresponds to a maximum supported data rate, a weighting factor for a first modulation order of a set of available modulation orders and a total number of supported layers, or a number of layers for which the first modulation order may be supported.

Some examples of the method, apparatuses, and non-transitory computer-readable medium described herein may further include operations, features, means, or instructions for receiving, from a second UE in a second connection establishment procedure, second UE capability information including a second UE category identifier, determining, based on one or more indicated carrier aggregation band combinations and numbers of supported layers for each composite carrier for the one or more indicated carrier aggregation band combinations, a second set of layers and corresponding modulation orders for the second set of layers for communication with the second UE over one or more carriers, and communicating with the second UE over the one or more carriers according to the second set of layers and corresponding modulation orders.

BRIEF DESCRIPTION OF THE DRAWINGS

FIG. 3 illustrates an example of a user equipment (UE) capability information that supports signaling of higher modulation order baseband capability in accordance with aspects of the present disclosure.

DETAILED DESCRIPTION

Figure 1:
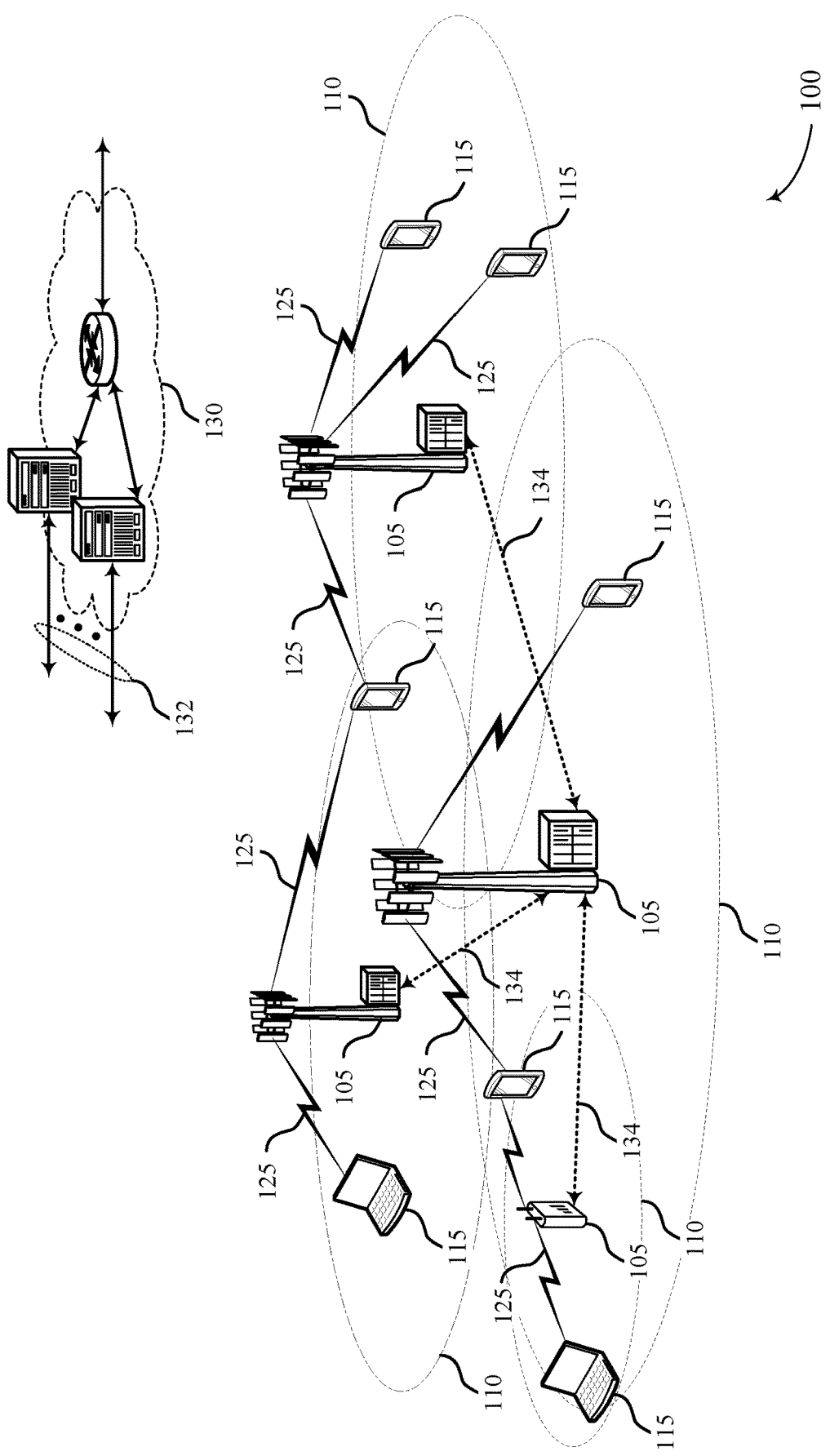
FIGS. 1 and 2 illustrate examples of a wireless communications system that supports signaling of higher modulation order baseband capability in accordance with aspects of the present disclosure.

User equipment (UEs) may signal UE capability parameters to a base station, for example, a next-generation NodeB (gNB). UE capability parameter signaling may include a UE category identifier, which may define downlink and uplink capabilities for UEs. In some examples, a UE category identifier may correspond to one or more capability parameters. At least one of the capability parameters may define a maximum number of downlink-shared channel (DL-SCH) transport block bits that UEs are capable of receiving or processing, for example, within a temporal period, such as a transmission time interval, slot, and the like. In some examples, the maximum number of DL-SCH transport block bits that UEs are capable of processing may be defined for a particular UE category as a single value, for example, N bits per symbol (bps). In other examples, the maximum number of DL-SCH transport block bits for a particular UE category may be a range. For example, downlink UE category identifier 22 (also referred to as DL UE Category 22) may be associated with a range for a maximum number of DL-SCH transport block bits of processing, for example, 2349504 bps to 2562784 bps.

In some examples, the UE capability parameters may not support signaling of a data rate upper bound within a range. For example, some systems may have no mechanism for UEs to signal an upper bound for a data rate within a range. Instead, these systems may rely on implying the supported data rate upper bound within a range using some other capability parameters, such as a carrier aggregation band combination capability parameter, or multiple-input multiple-output (MIMO) capability parameter, or modulation scheme parameter, or the like. In addition, some devices may support higher order modulation signaling such as 1024 Quadrature Amplitude Modulation (QAM). However, support for 1024QAM may result in many combinations of layers and modulation orders that are within the range for the maximum number of DL-SCH transport block bits, and some of these combinations may exceed the baseband processing capabilities of a given UE associated with the UE category.

UE capability parameter signaling may, in some examples, include one or more carrier aggregation combination entries. Each carrier aggregation combination entry may include a number of composite carrier band indicators, where each composite carrier band indicator may indicate a carrier band and band class. Each carrier aggregation combination entry may indicate a number of supported layers for each composite carrier band indicator. However, because a UE category may be associated with a range of a maximum number of DL-SCH transport block bits, some combinations of carrier bands, layers, and modulation orders may exceed the baseband capabilities of a given UE. The UE may provide individual carrier aggregation combination entries for each supported combination of composite carrier band indicators, numbers of supported layers, and supported modulation orders. However, the number of carrier aggregation combination entries may become large, for example resulting in tens of entries for a given set of composite carrier band indicators.

According to various aspects, UE capability parameter signaling is enhanced by extending capability signaling to support higher modulation order baseband capability, for example, such as 1024QAM. The described techniques may transmit a UE category identifier and a baseband capability parameter as part of UE capability parameter signaling (also referred to as UE capability information), to support improvements in UE capability parameter signaling. The baseband capability parameter may indicate a processing capability of UEs related to a number of layers, a modulation order, a data rate, and the like. The UE category identifier may be associated with a range for a maximum data rate, and the baseband capability parameter may include a maximum supported data rate within the range for the maximum data rate. In some examples, the baseband capability parameter may include a weighting factor for a modulation order of a set of available modulation orders and a total number of supported layers, or a number of layers for which a higher-order modulation order (e.g., 1024 QAM) is supported.

The described techniques may reduce overhead in signaling of carrier aggregation combination entries, for example signaling supported carrier aggregation combinations and supported modulation orders for each composite carrier band indicator without duplication of entries of the same set of composite carrier band indicators. That is, each carrier aggregation combination entry may correspond to a unique combination of composite carrier band indicators and numbers of supported layers for each component carrier for each composite carrier band indicator. In some cases, the described techniques support carrier aggregation combinations using different protocols. For example, the UE capability parameter signaling may include a first carrier aggregation combination entry associated with a first band combination including a first set of bands associated with a first protocol and a second set of bands associated with a second protocol. In some examples, the first carrier aggregation combination entry may include a first baseband capability parameter associated with the first protocol and a second baseband capability parameter associated with the second protocol. For example, the first baseband capability parameter may correspond to a protocol dependent baseband support associated with the first protocol and the second baseband capability parameter may correspond to a maximum supported data rate, a weighting factor for a first modulation order of a set of available modulation orders and a total number of supported layers, or a number of layers for which the first modulation order is supported.

Aspects of the disclosure are initially described in the context of a wireless communications system. Aspects of the disclosure are further illustrated in context of UE capability information and process flows that relate to aspects for signaling of higher modulation order baseband capability. Aspects of the disclosure are further illustrated by and described with reference to apparatus diagrams, system diagrams, and flowcharts that relate to signaling of higher modulation order baseband capability.

FIG. 1 illustrates an example of a wireless communications system 100 that supports signaling of higher modulation order baseband capability in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may comprise one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may configure UEs 115 with one or more UE capability parameters. As demand for an efficient wireless communications system 100 increases, UEs 115 in wireless communications system 100 may support improvements to UE capability parameter signaling. UE capability parameter signaling may, in some examples, include a UE category identifier, which may be a downlink UE category identifier. A downlink UE category identifier may define downlink capabilities for UEs 115. Each downlink UE category identifier may, in some examples, correspond to one or more capability parameters. At least one of the capability parameters may define a maximum number of downlink-shared channel (DL-SCH) transport block bits that UEs 115 are capable of processing, for example, receive within a temporal period. For example, for a downlink UE category identifier 22 (DL UE Category 22), the maximum number of DL-SCH transport block bits that UEs 115 are capable of processing may be a range, for example, 2349504 bps to 2562784 bps.

In some examples, the UE capability parameters may not support signaling a data rate upper bound within a range. That is, some systems may have no explicit manner, such as a capability field in an RRC message for UEs 115 to signal an upper bound for a data rate within a range. Instead, these methods depend on UEs 115 implying the supported data rate upper bound within a range using some other capability parameters in UE capability parameter signaling. For example, UEs 115 or base stations 105 may infer a supported data rate upper bound within a range according to a carrier aggregation band combination capability parameter, or MIMO capability parameter, or modulation scheme parameter, or a combination thereof.

By way of example, UEs 115 may support a downlink UE category identifier, for example as explained above, a DL UE Category 22. In one example, a UE 115 associated with DL UE Category 22 may support 24 layers using 256QAM (e.g., 24 layers across all carriers of a carrier aggregation band combination). However, the UE 115 may be unable to support 24 layers, where a subset or all layers uses 1024QAM. For example, if all layers use 1024QAM, the UE 115 may be able to support up to 20 layers instead of up to 24 layers. The 24 layers in a given carrier aggregation band combination may be downgraded to 20 layers in a variety of ways. Thus, to signal supported combinations of layers and modulation orders may result in several (e.g., tens) of carrier aggregation band combination for a given set of composite carrier band indicators. Signaling individual support for combinations of layers and modulation orders for each set of composite carrier band indicators may result in excessive overhead for UEs 115 and base stations 105.

The described techniques may transmit a UE category identifier and a baseband capability parameter as part of UE capability parameter signaling (also referred to as UE capability information), to support improvements in UE capability parameter signaling. The baseband capability parameter may indicate a processing capability of UEs related to a number of layers, a modulation order, a data rate, and the like. The UE category identifier may be associated with a range for a maximum data rate, and the baseband capability parameter may include a maximum supported data rate within the range for the maximum data rate. In some examples, the baseband capability parameter may include a weighting factor for a modulation order of a set of available modulation orders and a total number of supported layers, or a number of layers for which a higher-order modulation order (e.g., 1024 QAM) is supported.

Figure 2:
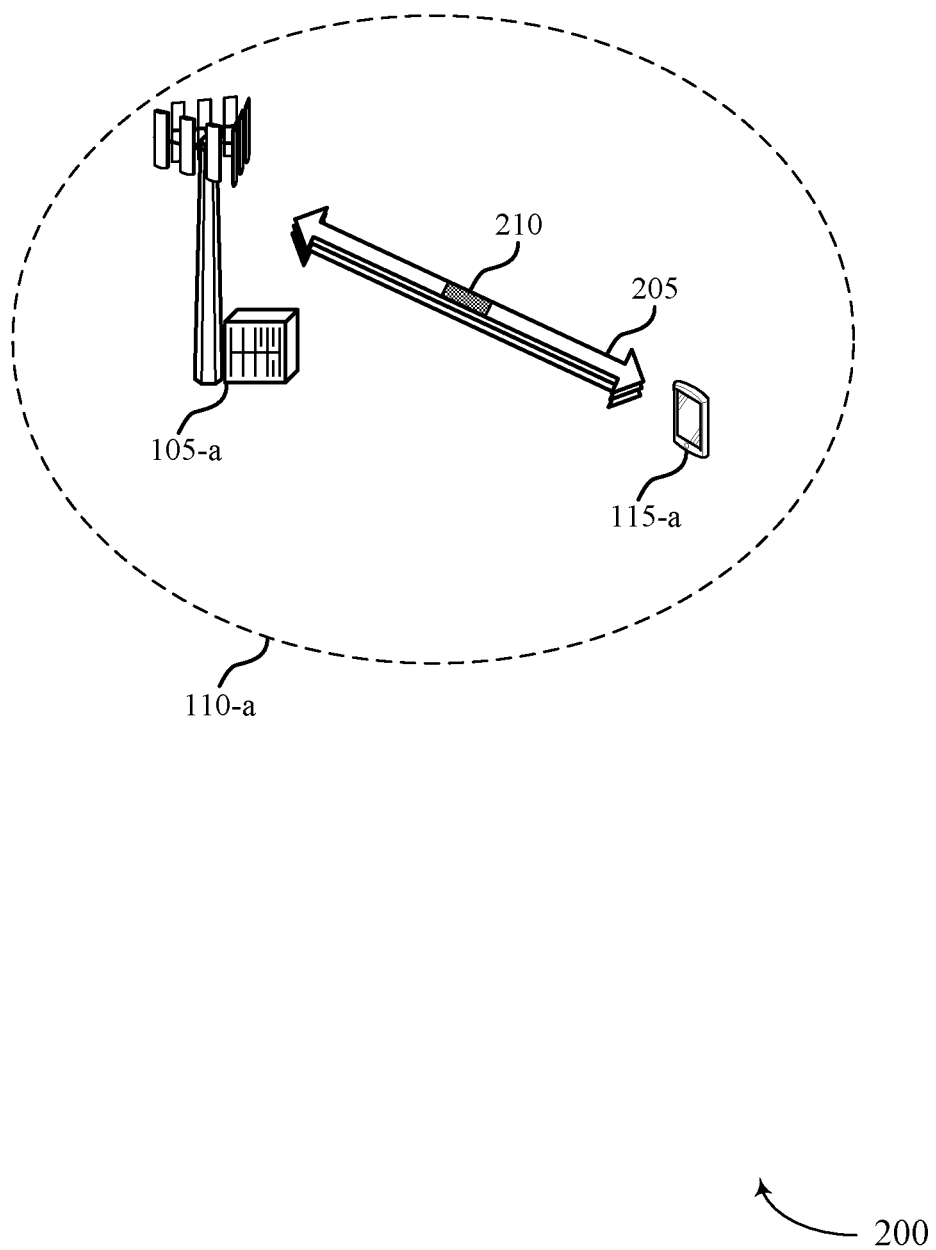

FIG. 2 illustrates an example of a wireless communications system 200 that supports signaling of higher modulation order baseband capability in accordance with aspects of the present disclosure. Wireless communications system 200 may include base station 105-a and UE 115-a, which may be examples of the corresponding devices described with reference to FIG. 1. In some examples, wireless communications system 200 may implement aspects of wireless communications system 100. For example, UE 115-a may support improvement in UE capability parameter signaling, such as higher modulation order (e.g., 1024QAM) baseband capability signaling.

In wireless communications system 200, base station 105-a may perform a connection procedure (e.g., a radio resource control procedure, such as a cell acquisition procedure, a random access procedure, a radio resource control connection procedure, a radio resource control configuration procedure, etc.) with UE 115-a. For example, base station 105-a and UE 115-a may perform a connection procedure to establish a communication link 205 for communication. In other examples, base station 105-a and UE 115-a may perform a connection procedure to re-establish a connection after connection failure (e.g., communication link 205 failure) with base station 105-a, or to establish a connection for handover to another base station, or the like. Base station 105-a and UE 115-a may also support multiple radio access technologies including 4G systems such as LTE systems, LTE-A systems, or LTE-A Pro systems, and 5G systems (which may be referred to as NR systems).

As part of the connection procedure, UE 115-a may provide capability information to base station 105-a. For example, UE 115-a may transmit UE capability information 210 to base station 105-a via RRC signaling. In some examples, UE 115-a may transmit UE capability information 210 to base station 105-a, in response to a capability enquiry from base station 105-a during the connection procedure. In the example of FIG. 2, UE capability information 210 may include at least a UE category identifier and a baseband capability parameter. The baseband capability parameter may inform base station 105-a of a processing capability of UE 115-a related to a number of layers, a modulation order, a data rate, or any combination thereof. A UE category identifier, such as downlink UE category identifier, may inform base station 105-a of a UE category associated with a maximum data rate or a range for a maximum data rate.

UE capability information 210 may, in some examples, include one or more carrier aggregation combination entries. Each carrier aggregation combination entry may include a number of composite carrier band indicators, where each composite carrier band indicator may indicate a carrier band and band class. Each carrier aggregation combination entry may indicate a number of supported layers for each composite carrier band indicator. However, because a UE category may be associated with a range of maximum number of DL-SCH transport block bits, some combinations of carrier bands, layers, and modulation orders may exceed the baseband capabilities of a given UE. The UE may provide individual carrier aggregation combination entries for each supported combination of composite carrier band indicators, numbers of supported layers, and supported modulation orders. However, the number of carrier aggregation combination entries may become large, for example resulting in tens of entries for a given set of composite carrier band indicators.

FIG. 3 illustrates an example of UE capability information 300 in accordance with aspects of the present disclosure. In some examples, UE capability information 300 may be implemented by aspects of wireless communications systems 100 and 200, as described with reference to FIGS. 1 and 2. For example, UE capability information 300 may include one or more entries 301, 302 that define one or more capabilities of a UE. In the example of FIG. 3, the one or more example entries 301, 302 may include a carrier aggregation field 310, a MIMO field 315, and a DL1024QAM field 320.

The carrier aggregation field 310 may define a carrier aggregation capability of a UE. The carrier aggregation field 310 may include carrier aggregation configuration fields 325-a through 325-h (collectively referred to herein as carrier aggregation configuration fields 325). The carrier aggregation configuration fields 325 may define a carrier aggregation configuration for a carrier band combination. In some examples, the carrier aggregation configuration fields 325 may define a carrier band and a band class (also referred to as a composite band indicator). For example, a first carrier band combination entry 301 may include a first carrier aggregation configuration field 325-*a* including a composite band indicator "1A," which may define a band (e.g., band 1) and a band class (e.g., "A") that indicates maximum number of component carriers for this class (e.g., one component carrier). A second carrier aggregation configuration field 325-*b* may include a composite band indicator "3C" which may define a band (e.g., band 3) and a band class (e.g., "C") that indicates a maximum number of component carriers for this class (e.g., two component carriers). Similarly, a third carrier aggregation configuration field 325-*c* may include a composite band indicator "7C," which may define a band (e.g., band 7) and a band class ("C") that indicates a maximum number of component carriers for this class (e.g., two component carrier), and a fourth carrier aggregation configuration field 325-*d* may include a composite band indicator "28A," which may define a band (e.g., band 28) and a band class ("A") indicating a maximum number of component carriers for this class (e.g., one component carriers). Other carrier band combination entries may have more or fewer composite band indicators in other examples. The bands and band classes included in FIG. 3 are shown for purposes of illustration, while other composite band indicators may use different bands or band classes.

The MIMO field 315 may define a number of supported layers for each component carrier of a band. For example, for the first carrier aggregation combination entry 301, the number of supported layers may be four for composite band indicators "1A" and "28A," while the number of supported layers may be four for each component carrier of the two component carriers for composite band indicators "3C" and "7C." The DL1024QAM field 320 may include a value (e.g., binary value) that indicates whether 1024QAM is supported for each of the composite band indicators 325. In the example of the first carrier aggregation combination entry 301, 1024QAM may not be supported for any of the composite band indicators 325 as indicated by the dashes for the DL1024QAM field 320.

UEs may support a downlink UE category identifier, for example as explained above, a DL UE Category 22 via either 24 layers 256QAM or 20 layers 1024QAM. The 24 layers may correspond to a total number of MIMO layers (e.g., 1024QAM MaxLayers) across all carriers. However, UEs may be unable to support 24 layers when one or more layers uses 1024QAM, due to a maximum layer and modulation dependency. As a result, due to a baseband dependency, each 24 layer band combination may be downgraded to 20 layers in one or more different ways, which may result in multiple band combination entries for a given set of composite band indicators. For example, one way of downgrading the number of supported layers for the first carrier band combination entry 301 may be to reduce the number of supported layers for one or more composite band indicators. For example, for carrier aggregation band combination entry 302, the number of layers for composite band indicators 325-*a* and 325-*d* may be reduced from 4 to 2. As shown in carrier aggregation band combination entry 302, the reduced number of layers (e.g., 20) may be allocated to composite band indicators 325-*e*, 325-*f*, 325-*g*, and 325-*h*, as 2, 4-4, 4-4, and 2, respectively. Although multiple carrier aggregation band combination entries convey possible combinations of bands, layers, and modulation orders supported by a UE 115, the number of combinations may result in excessive overhead for UEs. It may therefore be advantageous to improve UE capability parameter signaling by extending capability signaling from UEs to base stations, to support higher modulation order baseband capability, for example, such as 1024QAM, as described with reference to FIG. 2. By extending the capability signaling in UE capability information 300 to support higher modulation order baseband capability, UEs may effectively provide capability information 300 reports without excessive overhead.

Returning to FIG. 2, UE 115-*a* or base station 105-*a* may support enhancements in UE capability parameter signaling, such as higher modulation order (e.g., 1024QAM) baseband capability signaling. For example, UE 115-*a* may include a maximum supported data rate within a range for a maximum data rate as part of the baseband capability parameter. In one example, in addition to providing its UE category identifier (e.g., DL Category 22), UE 115-*a* may also signal a maximum number of DL-SCH bits per TTI supported by UE 115-*a*. In some examples, UE 115-*a* may signal a UE category identifier and a maximum number of DL-SCH bits per TTI supported by UE 115-*a* in RRC signaling. UE 115-*a* may, in some examples, signal the maximum number of DL-SCH bits per TTI separately for standalone (SA) deployment and for E-UTRAN NR dual connectivity (EN-DC) deployment. The indicated maximum number of DL-SCH bits per TTI supported by UE 115-*a* may restrict the scheduling by base station 105-*a* so as not to exceed the baseband processing capability of the UE 115-*a*, even when within the range of maximum number of DL-SCH transport block bits associated with the UE category of the UE 115-*a*.

In some examples of enhanced UE capability parameter signaling, the baseband capability parameter may include a weighting factor (also referred to as a scaling factor) for a first modulation order of a set of available modulation orders and a total number of supported layers. For example, UE 115-*a* may signal two additional baseband capability parameters x and y, where x defines a weighting or scaling factor applied to higher modulation order (e.g., 1024QAM) enabled carriers and layers, and y defines a total number of MIMO layers across all carriers supported by UE 115-*a*. UE 115-*a* may use the two additional parameters to define 1024QAM capability as follows:

$$x \cdot Num_{Layers,1024QAM} + Num_{Layers,non1024QAM} \leq y \qquad (1)$$

where $Num_{Layers,1024QAM}$ defines a total number of layers for 1024QAM across all component carriers supported by UE 115-*a* and $Num_{Layers,non1024QAM}$ defines a total number of downlink layers for other modulation orders (e.g., 256QAM) across all carriers supported by UE 115-*a*. In some examples, the other modulation orders are any modulation orders other than 1024QAM.

By way of example, for a higher UE category identifier, such as DL Category 22, UE 115-*a* may select the following values for x and y, {x=5/4, y=24}, where the ratio 5/4 corresponds to a modulation order ratio between 1024QAM and other modulation orders (e.g., 256QAM). UE 115-*a* therefore may indicate its capability of supporting up to 24 layers in other modulation orders (e.g., 64QAM, 256QAM) or up to 18 layers with 1024QAM, or up to 22 layers with a combination of 1024QAM, 256QAM, and 64QAM. In another example, for a higher UE category identifier, such as DL Category 22, UE 115-*a* may select the following values for x and y, {x=6/5, y=24}. Here, UE 115-*a* may indicate that it supports up to 24 Layers in 256QAM, 64QAM, or up to 20 layers with 1024QAM, or up to 22 layers with mixed 1024QAM, 256QAM, and 64QAM. As described herein, examples of the scaling factor x may include 1, 1.2, 1.25, or other example values.

Additionally or alternatively, UE 115-a may include, as part of the baseband capability parameter, a number of layers for which a modulation order is supported. For example, UE 115-a may signal an extra 1024QAM capability parameter y to indicate a maximum number of MIMO layers that UE 115-a can support for 1024QAM. In some examples, if the $\text{Num}_{Layers} \leq y$, UE 115-a may support 1024QAM on any carrier. Otherwise, no 1024QAM may be allowed on any carrier. As described herein, examples of the 1024QAM capability parameter y may include 10, 12, 14, . . . , 30, or other example values.

In some examples, UE 115-a may signal the baseband capability parameter without specifying an association between the baseband capability parameter and radio protocols or radio band frequencies. That is, the baseband capability parameter may apply to all carrier aggregation band combinations. Alternatively, UE 115-a may signal such capability information elements per band combination to indicate support for a higher modulation order. This technique may provide flexibility for UE 115-a or base station 105-a to employ baseband processing across various band combinations. For example, for EN-DC (i.e., LTE and NR concurrency), modem resources may be divided between technologies and it may be advantageous for UE 115-a to signal various combinations of NR band combinations and LTE band combinations with different restrictions on use of higher modulation orders (e.g., 1024QAM). That is, each carrier aggregation band combination entry may include one or more protocol dependent baseband capability parameters. For example, UE 115-a may be capable of supporting NR with a first bandwidth $b_1$ MHz and $y_1$ LTE 1024QAM layers, or NR with a second bandwidth $b_2$ MHz and $y_2$ LTE 1024QAM layers, or the like.

Base station 105-a may receive UE capability information 210 from UE 115-a, as part of the connection procedure, and determine a set of layers and corresponding modulation orders for the set of layers for communication with UE 115-a over one or more carriers. For example, base station 105-a may determine corresponding modulation orders for the set of layers for communication with UE 115-a over one or more carriers based on the baseband capability parameter included in UE capability information 210. The baseband capability parameter may indicate a processing capability of UE 115-a related to a number of layers, a modulation order, a data rate, or a combination thereof, as discussed above.

Particular aspects of the wireless communications system 200 described herein may be implemented to realize one or more of the following potential advantages. The described signaling of higher modulation order baseband capability in the wireless communications system 200 may support improved data rates and enhanced signaling reliability, among other advantages. Supported signaling of higher modulation order baseband capability may include features for reducing signaling overhead of UE capability information related to carrier aggregation band combinations. The described techniques may also support increased spectral efficiency and, in some examples, may promote low latency communication, among other benefits.

Figure 4:
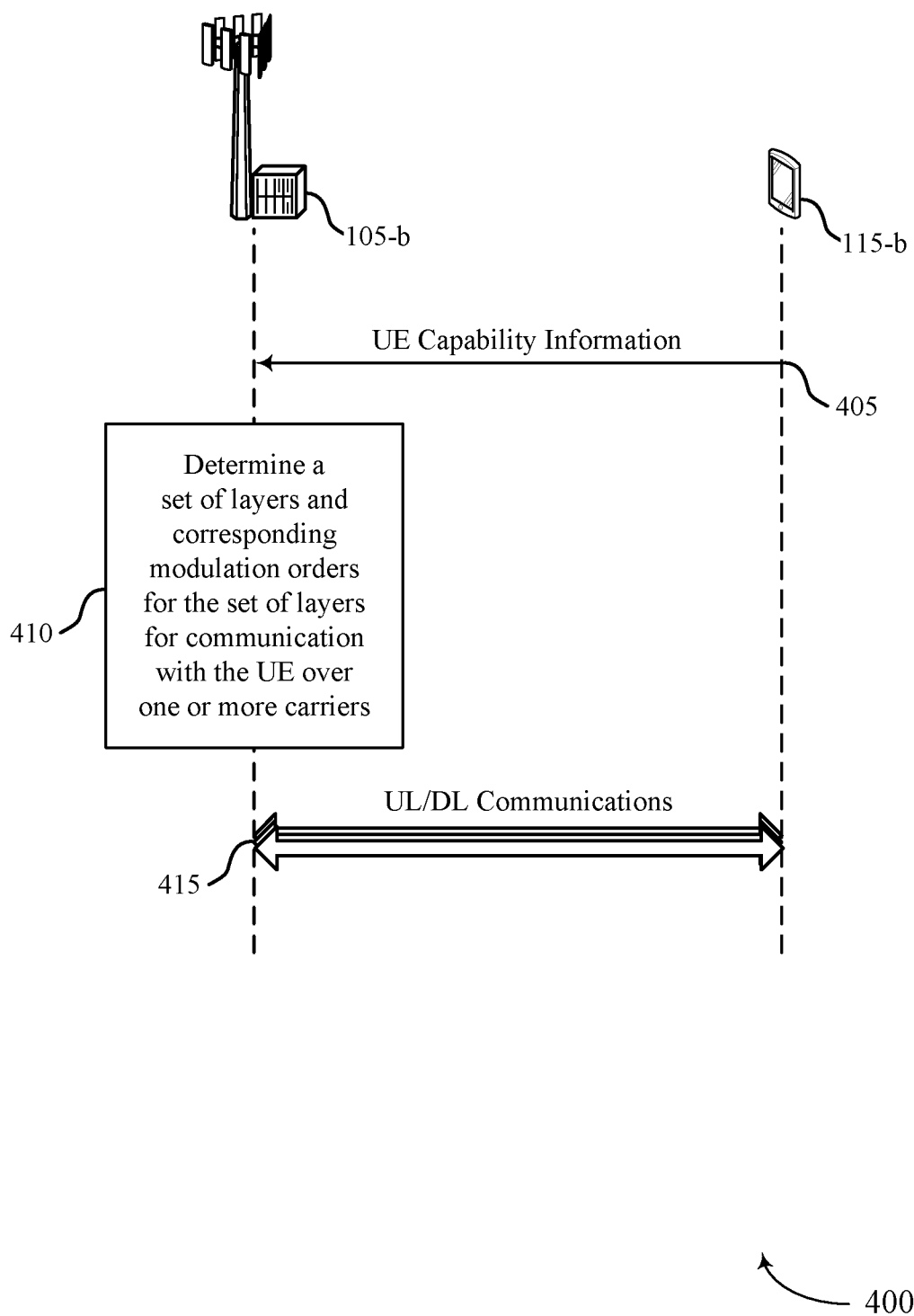
FIG. 4 illustrates an example of a process flow that supports signaling of higher modulation order baseband capability in accordance with aspects of the present disclosure.

FIG. 4 illustrates an example of a process flow 400 that supports signaling of higher modulation order baseband capability in accordance with aspects of the present disclosure. In some examples, process flow 400 may be implemented by aspects of wireless communications systems 100 and 200, as described with reference to FIGS. 1 and 2. The process flow 400 may include a base station 105-b and a UE 115-b, which may be examples of the corresponding devices described with reference to FIGS. 1 and 2. In the following description of the process flow 400, the operations between the base station 105-b and the UE 115-b may be transmitted in a different order than the exemplary order shown, or the operations performed by the base station 105-b and the UE 115-b may be performed in different orders or at different times. Some operations may also be omitted from the process flow 400, and other operations may be added to the process flow 400.

At 405, the UE 115-b may transmit UE capability information to the base station 105-b. The UE capability information may include a UE category identifier and a baseband capability parameter. In some examples, the baseband capability parameter may indicate a processing capability of the UE 115-b related to a number of layers, a modulation order, a data rate, or a combination thereof. In some examples, the baseband capability parameter indicating a scaling factor for a first modulation order of a plurality of available modulation orders. In some other examples, the UE category identifier may be associated with a range for a maximum data rate, and the baseband capability parameter may include a maximum supported data rate within the range for the maximum data rate. In other examples, the baseband capability parameter may include a weighting factor for a modulation order of a set of available modulation orders and a total number of supported layers. In some other examples, the baseband capability parameter may include a number of layers for which a modulation order is supported. Additionally, or alternatively, the UE capability information may include a set of carrier aggregation combination entries, and each carrier aggregation combination entry may be associated with a corresponding baseband capability parameter, as described with reference to FIGS. 1 through 3.

In some examples, the baseband capability parameter may include a scaling factor for a first modulation order of a set of available modulation orders and a total number of supported layers. For example, UE 115-b may signal two additional baseband capability parameters x and y at 405, where x defines a scaling factor applied to higher modulation order (e.g., 1024QAM) enabled carriers and layers, and y defines a total number of MIMO layers across all carriers supported by UE 115-b. UE 115-b may use the two additional parameters to define 1024QAM capability described above in Equation (1).

By way of example, for a higher UE category identifier, such as DL Category 22, UE 115-b may select the following values for x and y, {x=1.25, y=24}, where 1.25 corresponds to a modulation order ratio between 1024QAM and other modulation orders (e.g., 256QAM). UE 115-b therefore may indicate its capability of supporting up to 24 layers in other modulation orders (e.g., 64QAM, 256QAM) or up to 18 layers with 1024QAM, or up to 22 layers with a combination of 1024QAM, 256QAM, and 64QAM. In another example, for a higher UE category identifier, such as DL Category 22, UE 115-b may select the following values for x and y, {x=1.2, y=24}. Here, UE 115-b may indicate that it supports up to 24 Layers in 256QAM, 64QAM, or up to 20 layers with 1024QAM, or up to 22 layers with mixed 1024QAM, 256QAM, and 64QAM.

Additionally or alternatively, UE 115-b may include, as part of the baseband capability parameter, a number of layers for which a modulation order is supported. For example, UE 115-b may signal an extra 1024QAM capability parameter y to indicate a maximum number of MIMO layers that UE 115-b can support for 1024QAM. In some examples, if the $\text{Num}_{Layers} \leq y$, UE 115-b may support 1024QAM on any carrier. Otherwise, no 1024QAM may be allowed on any carrier.

At 410, the base station 105-*b* may determine a set of layers and corresponding modulation orders for the set of layers for communication with the UE 115-*b* over one or more carriers. The determination may be based on the baseband capability parameter determined from the received in UE capability information 405.

At 415, the process flow 400 may proceed with the base station 105-*b* and the UE 115-*b* communicating uplink and downlink communications, for example, such as control information, data, and the like over one or more carriers according to the set of layers and corresponding modulation orders. For example, the base station 105-*b* may determine a carrier configuration for the UE 115-*b* that may be based on a carrier aggregation combination entry from the set of carrier aggregation combination entries. The base station 105-*a* may then apply modulation orders to carriers associated with the carrier aggregation combination entry such that the baseband capability parameter is satisfied. In some examples, however, if the base station 105-*b* schedules (e.g., provisionally) more than the UE capability information indicates the UE 115-*b* is capable of handling, the base station 105-*b* may backoff and reschedule based on the determination that the provisional schedule exceeds the baseband capability parameter.

In some examples, the communications 415 includes communicating over a first number of layers of the first modulation order and a second number of layers of other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor. In some examples, the communications 415 from the UE comply with the baseband parameter, defined as the scaling factor, x, and a total number of supported layers, y, and wherein a capability of the UE is given by Equation (1) described above.

The operations performed by the base station 105-*b* and the UE 115-*b* as part of, but not limited to, process flow 400 may provide improvements to UE capability parameter signaling. Furthermore, the operations performed by the base station 105-*b* and the UE 115-*b* as part of, but not limited to, process flow 400 may provide benefits and enhancements to the operation of the UE 115-*b*. For example, the described signaling of higher modulation order baseband capability in the process flow 400 may support improved data rates and enhanced signaling reliability, among other advantages. The described techniques may also support increased spectral efficiency and, in some examples, may promote low latency communication, among other benefits.

Figure 5:
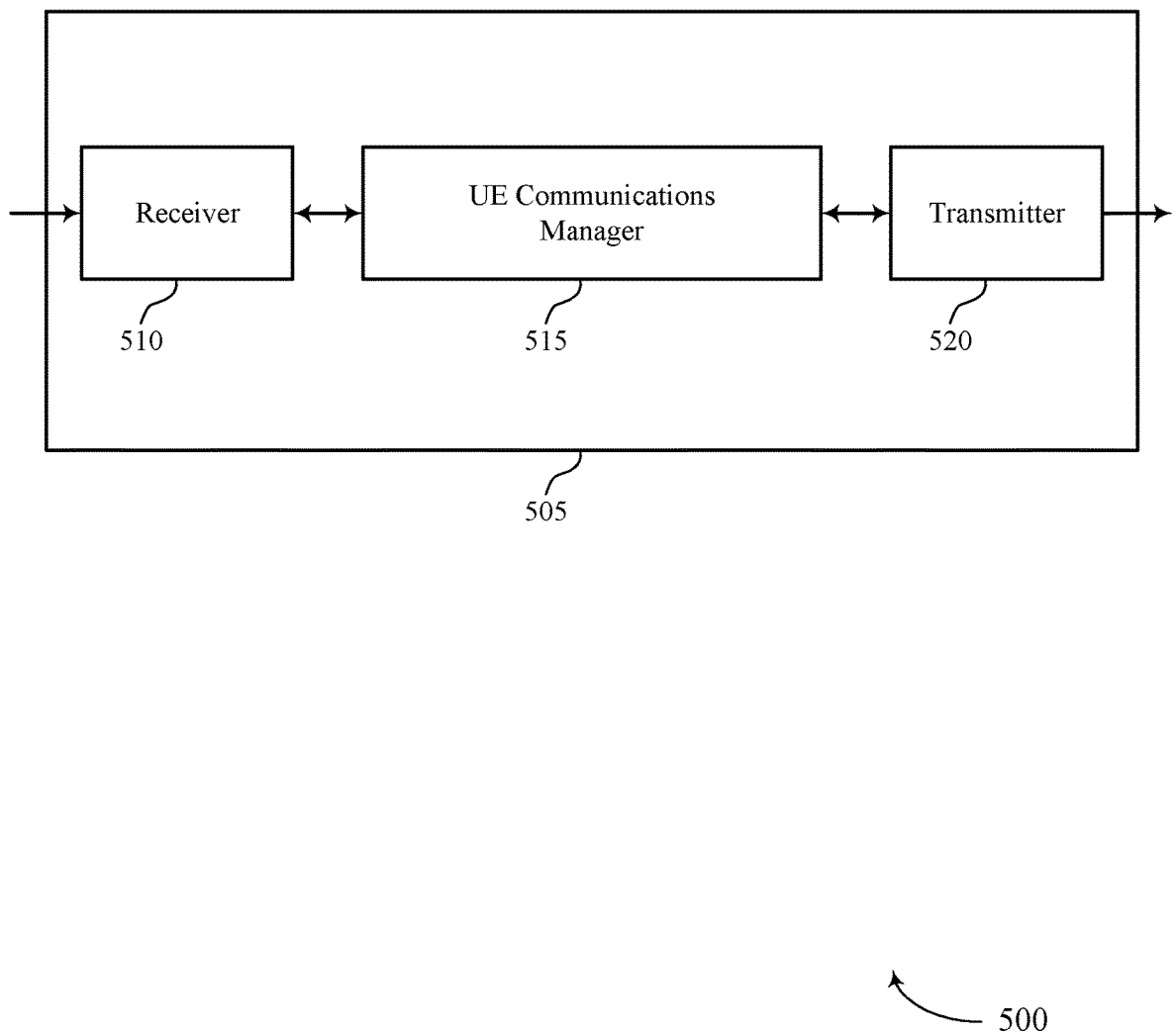
FIGS. 5 and 6 show block diagrams of devices that support signaling of higher modulation order baseband capability in accordance with aspects of the present disclosure.

FIG. 5 shows a block diagram 500 of a device 505 that supports signaling of higher modulation order baseband capability in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling of higher modulation order baseband capability, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may transmit UE capability information to a base station in a connection establishment procedure, the UE capability information including a UE category identifier and a baseband capability parameter, the baseband capability parameter indicating a processing capability of the UE related to a number of layers, a modulation order, a data rate, or a combination thereof and communicate with the base station over a plurality of layers using corresponding modulation orders for the plurality of layers. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
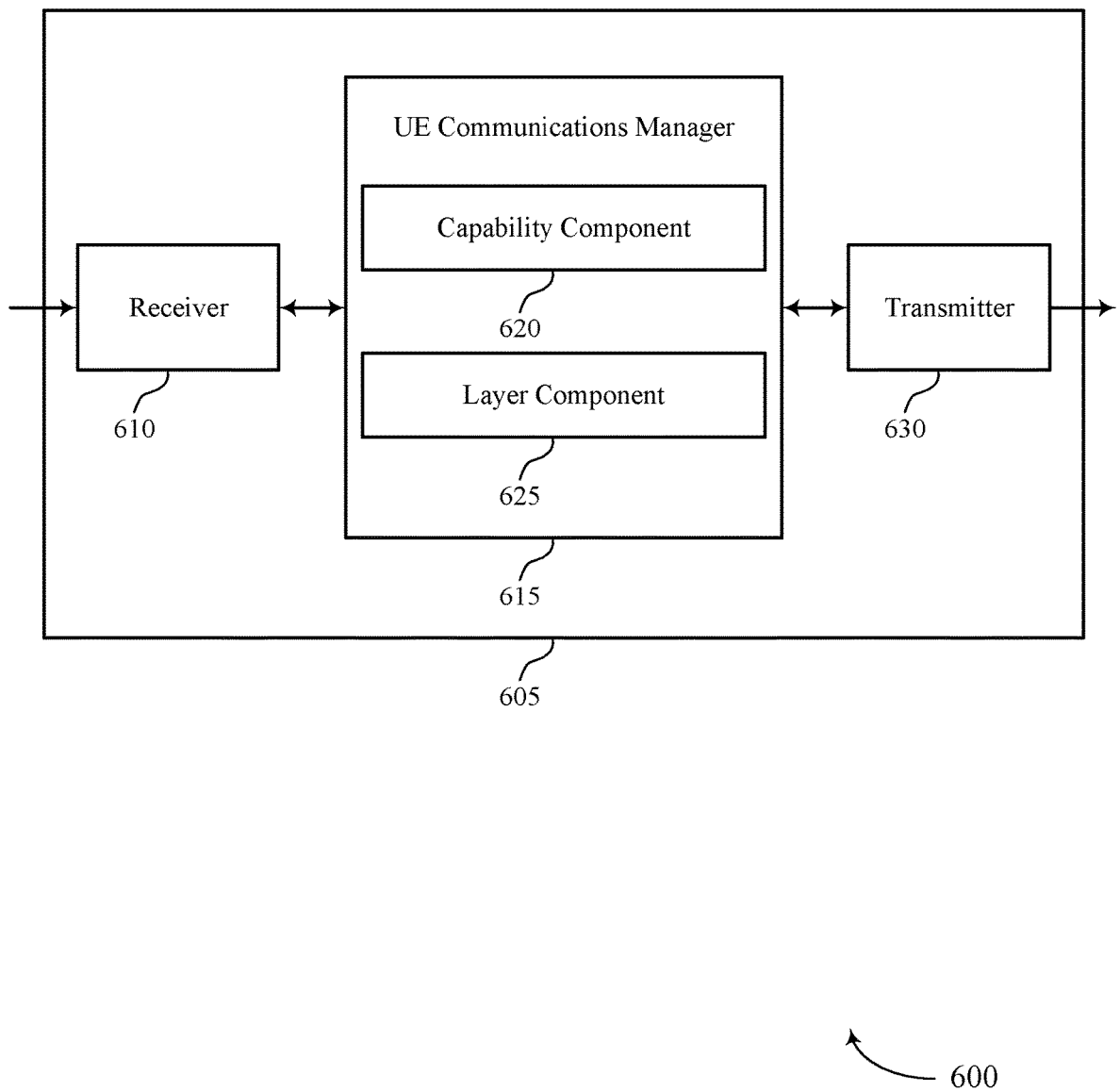

FIG. 6 shows a block diagram 600 of a device 605 that supports signaling of higher modulation order baseband capability in accordance with aspects of the present disclosure. The device 605 may be an example of aspects of a device 505, or a UE 115 as described herein. The device 605 may include a receiver 610, a UE communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to signaling of higher modulation order baseband capability, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a capability component 620 and a layer component 625. The UE communications manager 615 may be an example of aspects of the UE communications manager 810 described herein.

The capability component 620 may transmit UE capability information to a base station in a connection establishment procedure, the UE capability information including a UE category identifier and a baseband capability parameter, the baseband capability parameter indicating a processing capability of the UE related to a number of layers, a modulation order, a data rate, or a combination thereof. The layer component 625 may communicate with the base station over a plurality of layers using corresponding modulation orders for the plurality of layers.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
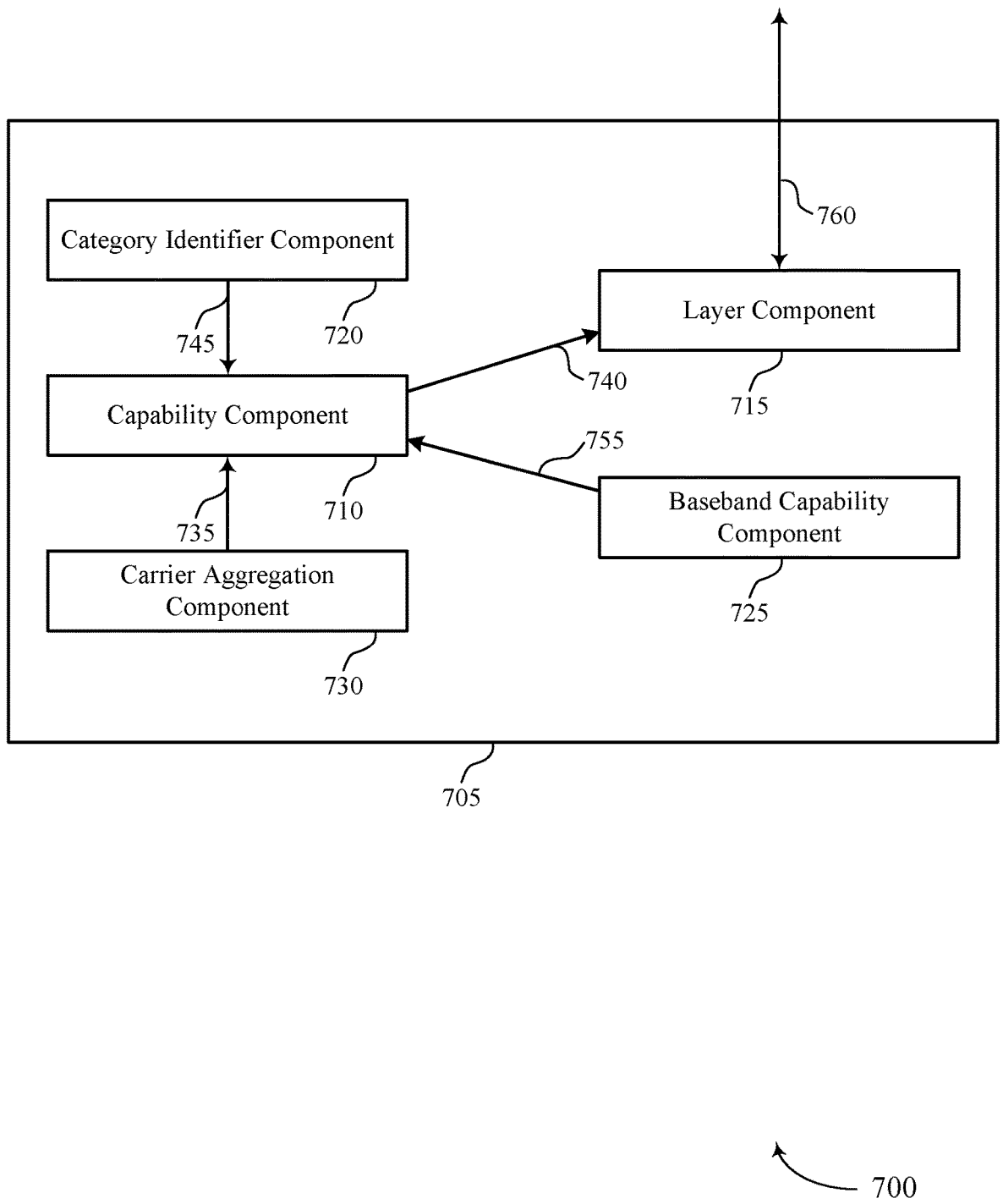
FIG. 7 shows a block diagram of a UE communications manager that supports signaling of higher modulation order baseband capability in accordance with aspects of the present disclosure.

FIG. 7 shows a block diagram 700 of a UE communications manager 705 that supports signaling of higher modulation order baseband capability in accordance with aspects of the present disclosure. The UE communications manager 705 may be an example of aspects of a UE communications manager 515, a UE communications manager 615, or a UE communications manager 810 described herein. The UE communications manager 705 may include a capability component 710, a layer component 715, a category identifier component 720, a baseband capability component 725, and a carrier aggregation component 730. Each of these modules may communicate, directly or indirectly, with one another (e.g., via one or more buses).

The capability component 710 may transmit UE capability information 740 to the layer component, which then communicates with a base station in a connection establishment procedure. UE capability information 740 may include a UE category identifier and a baseband capability parameter, the baseband capability parameter indicating a processing capability of the UE related to a number of layers, a modulation order, a data rate, or a combination thereof. The layer component 715 may communicate with the base station over one or more carriers over communications 760 according to a set of layers and corresponding modulation orders for the set of layers. The communications 760 may include the UE capability information 740.

The category identifier component 720 may determine the UE category identifier. In some examples, the UE category identifier may be associated with a range for a maximum data rate. In some other examples, the baseband capability parameter may include a maximum supported data rate within the range for the maximum data rate. The UE category identifier component 720 may send a UE category identifier signal 745 to the capability component 710. The capability component 710 may include some or all of the UE category identifier signal 745 in the UE capability information 740 forwarded to the layer component 715.

The baseband capability component 725 may determine the baseband capability parameter. The baseband capability component 725 may send a baseband capability parameter signal 755 to the capability component 710. The baseband capability parameter signal 755 may identify the baseband capability parameter. In some examples, the baseband capability parameter may include a weighting factor for a first modulation order of a set of available modulation orders and a total number of supported layers. In some other examples, the baseband capability parameter may include a number of layers for which a first modulation order may be supported. In other examples, a first baseband capability parameter may correspond to a protocol dependent baseband support associated with the first protocol and a second baseband capability parameter may correspond to a maximum supported data rate, a weighting factor for a first modulation order of a set of available modulation orders and a total number of supported layers, or a number of layers for which the first modulation order may be supported. The capability component 710 may include some or all of the baseband capability parameter signal 755 in the UE capability information 740 forwarded to the layer component 715.

The carrier aggregation component 730 may determine the UE capability information. In some examples, the UE capability information may include one or more carrier aggregation combination entries. The carrier aggregation component 730 may send one or more carrier aggregation combination entry signals 735 to the capability component 710. The one or more carrier aggregation combination entry signals 735 may identify one or more carrier aggregation combination entries. In some other examples, each carrier aggregation combination entry may correspond to a unique combination of composite carrier band indicators and numbers of supported layers for each component carrier for each composite carrier band indicator. In other examples, each composite carrier band indicator may include a carrier band and band class. In some examples, the UE capability information may include a set of carrier aggregation combination entries. In some other examples, each carrier aggregation combination entry may be associated with a corresponding baseband capability parameter. In some examples, the UE capability information may include the first carrier aggregation combination entry associated with the first band combination including the first set of bands associated with the first protocol and the second set of bands associated with the second protocol, the first carrier aggregation combination entry including the first baseband capability parameter associated with the first protocol and the second baseband capability parameter associated with the second protocol. In some other examples, the UE capability information may include a second carrier aggregation combination entry associated with the first band combination, the first carrier aggregation combination entry including a third baseband capability parameter associated with the first protocol and a fourth baseband capability parameter associated with the second protocol. The capability component 710 may include some or all of the one or more carrier aggregation combination entry signals 735 in the UE capability information 740 forwarded to the layer component 715.

Figure 8:
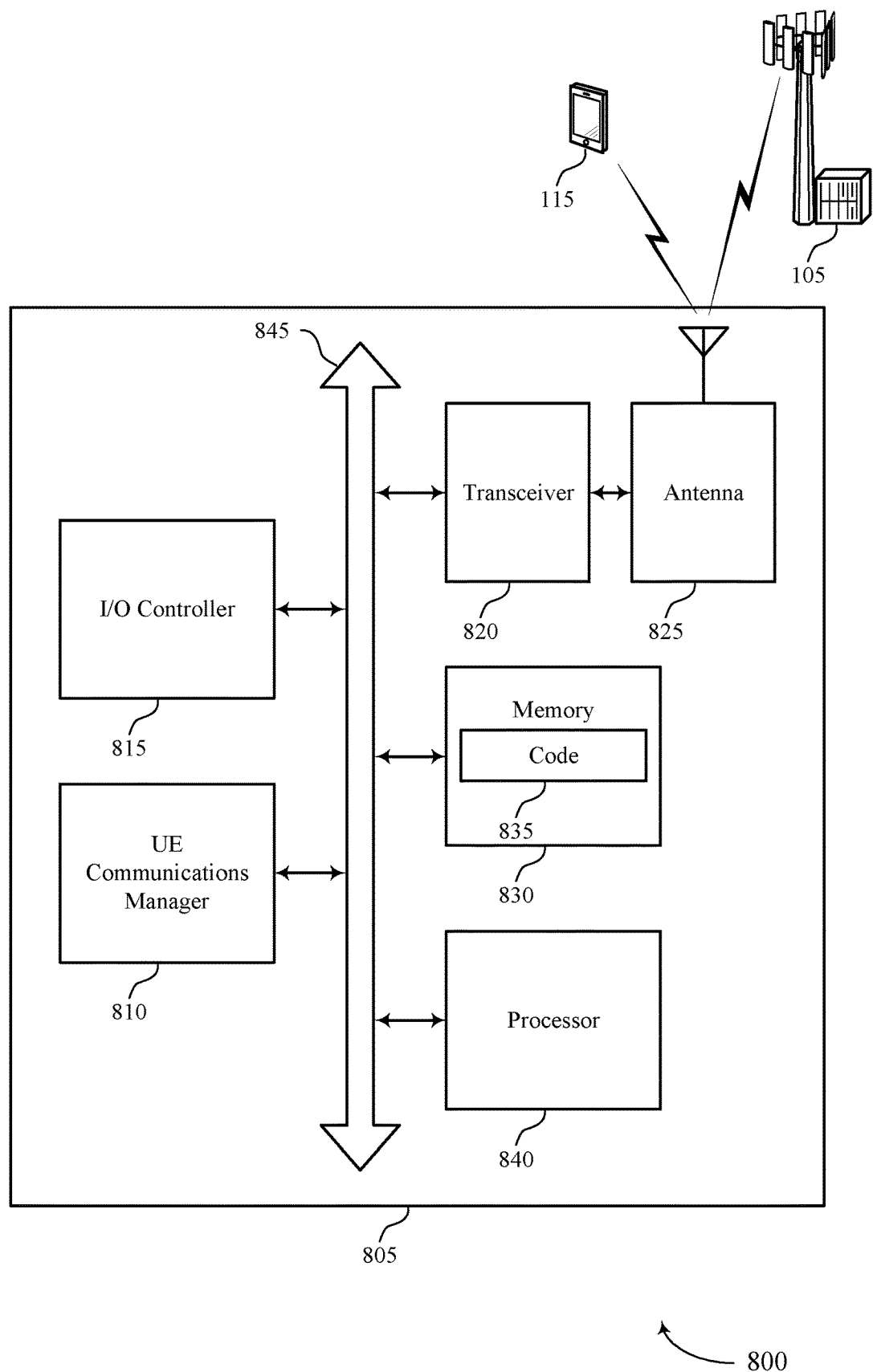
FIG. 8 shows a diagram of a system including a device that supports signaling of higher modulation order baseband capability in accordance with aspects of the present disclosure.

FIG. 8 shows a diagram of a system 800 including a device 805 that supports signaling of higher modulation order baseband capability in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may transmit UE capability information to a base station in a connection establishment procedure, the UE capability information including a UE category identifier and a baseband capability parameter, the baseband capability parameter indicating a processing capability of the UE related to a number of layers, a modulation order, a data rate, or a combination thereof and communicate with the base station over a plurality of layers using corresponding modulation orders for the plurality of layers.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling of higher modulation order baseband capability).

Figure 9:
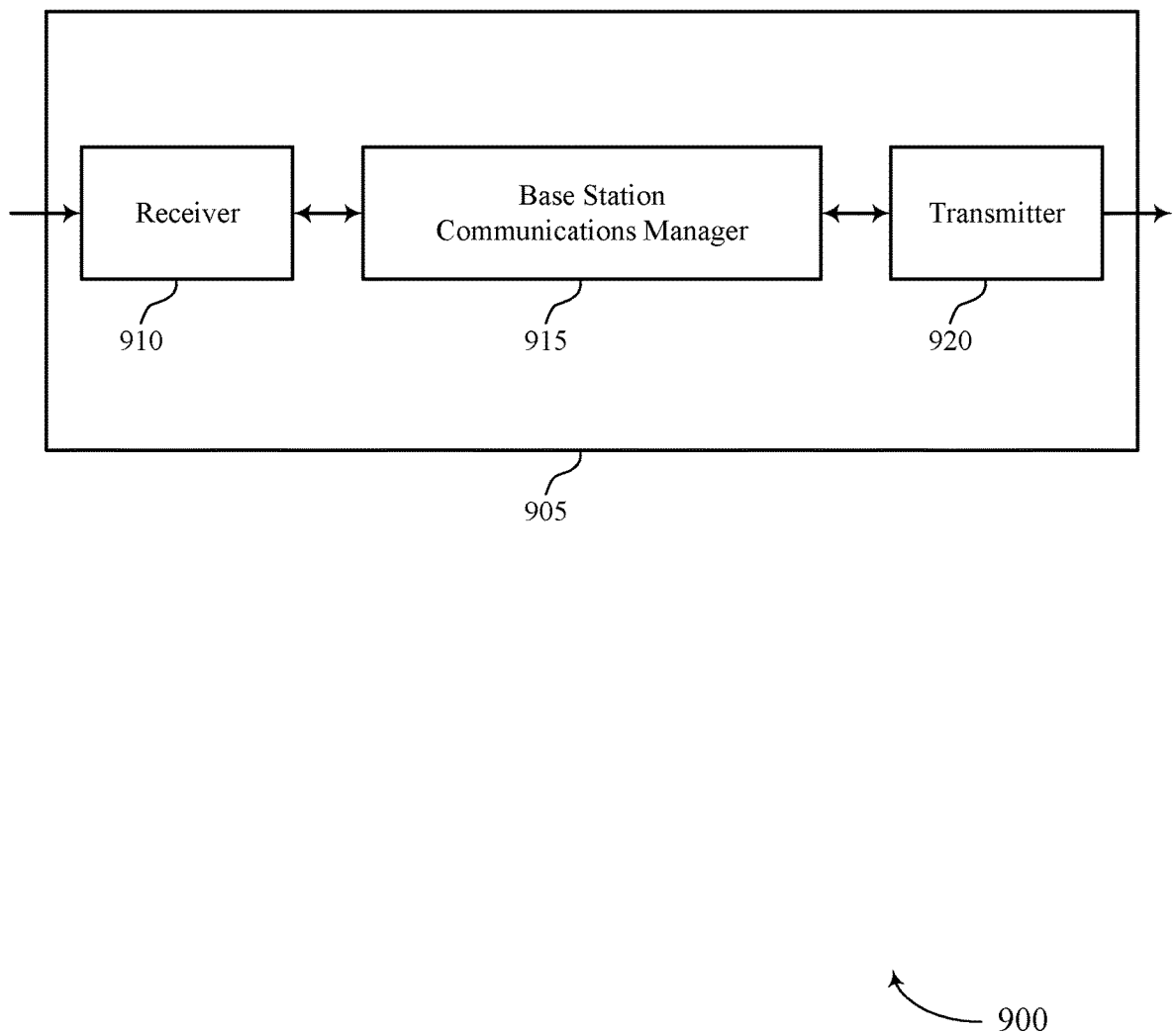
FIGS. 9 and 10 show block diagrams of devices that support signaling of higher modulation order baseband capability in accordance with aspects of the present disclosure.

FIG. 9 shows a block diagram 900 of a device 905 that supports signaling of higher modulation order baseband capability in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling of higher modulation order baseband capability, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive, from a UE in a connection establishment procedure, UE capability information including a UE category identifier and a baseband capability parameter, the baseband capability parameter indicating a processing capability of the UE related to a number of layers, a modulation order, a data rate, or a combination thereof, determine, based on the baseband capability parameter, a set of layers and corresponding modulation orders for the set of layers for communication with the UE over one or more carriers, and communicate with the UE over the plurality of layers using corresponding modulation orders. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
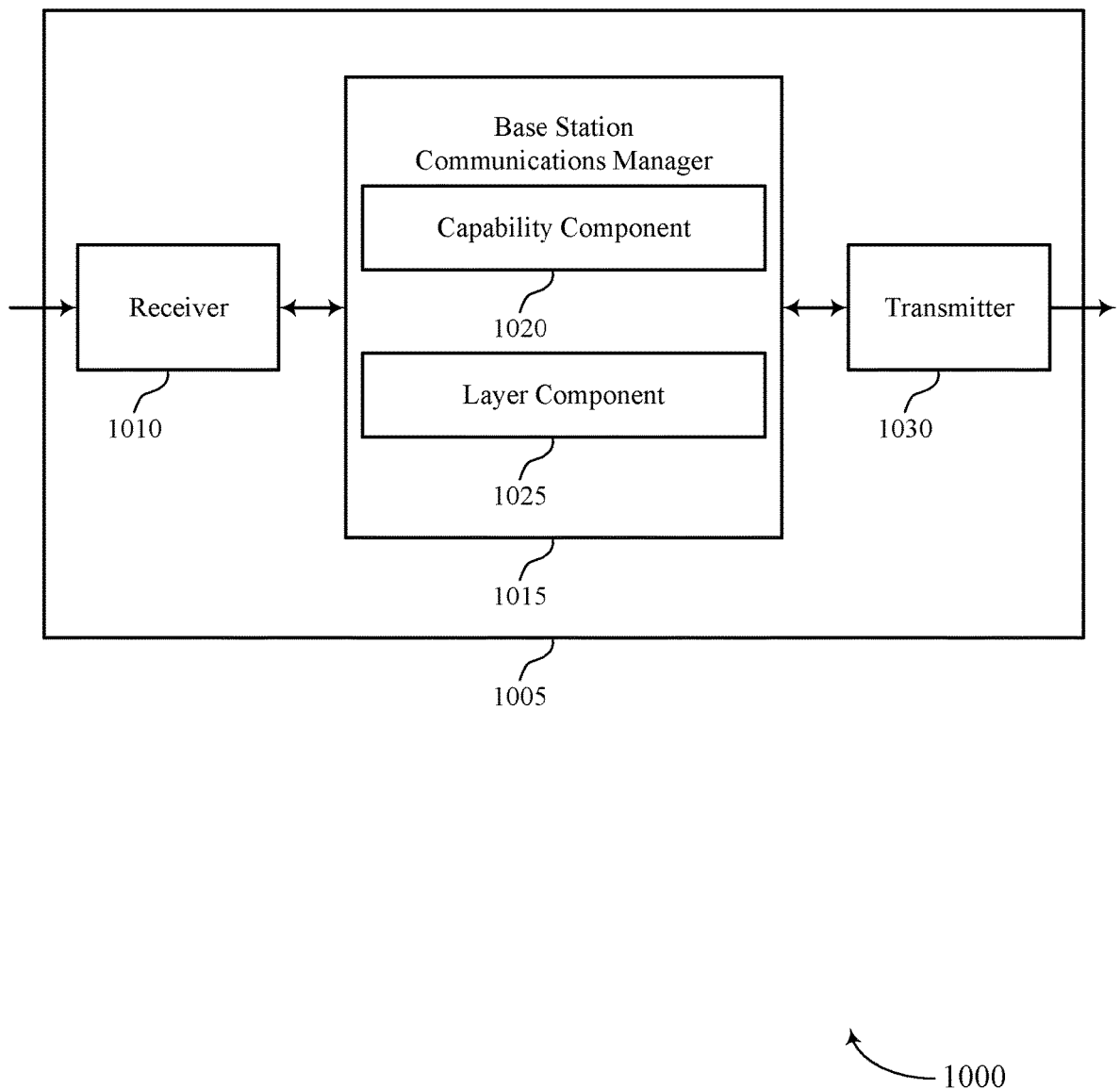

FIG. 10 shows a block diagram 1000 of a device 1005 that supports signaling of higher modulation order baseband capability in accordance with aspects of the present disclosure. The device 1005 may be an example of aspects of a device 905, or a base station 105 as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling of higher modulation order baseband capability, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a capability component 1020 and a layer component 1025. The base station communications manager 1015 may be an example of aspects of the base station communications manager 1210 described herein.

The capability component 1020 may receive, from a UE in a connection establishment procedure, UE capability information including a UE category identifier and a baseband capability parameter, the baseband capability parameter indicating a processing capability of the UE related to a number of layers, a modulation order, a data rate, or a combination thereof. The layer component 1025 may determine, based on the baseband capability parameter, a set of layers and corresponding modulation orders for the set of layers for communication with the UE over one or more carriers and communicate with the UE over the set of layers using corresponding modulation orders.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
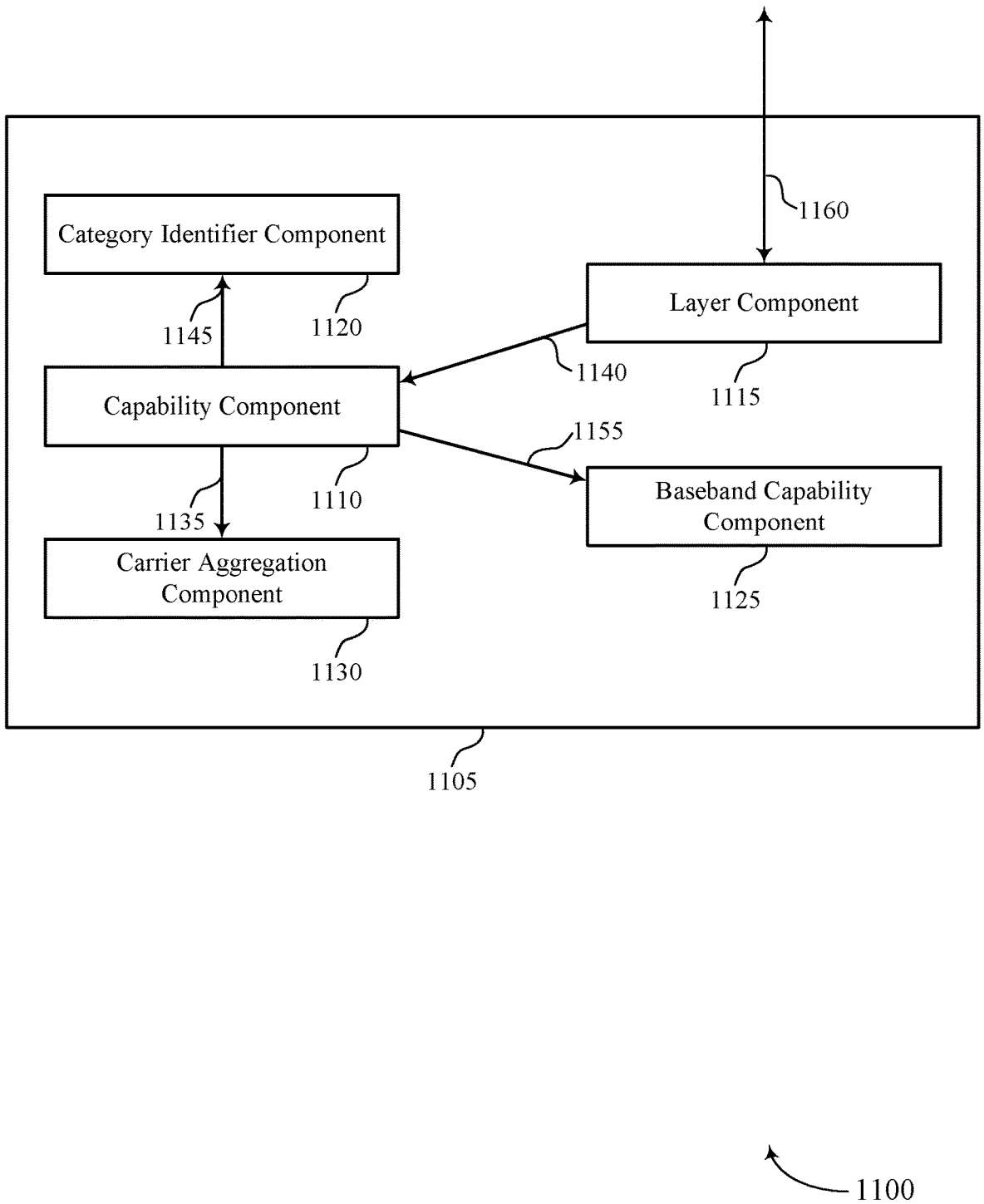
FIG. 11 shows a block diagram of a base station communications manager that supports signaling of higher modulation order baseband capability in accordance with aspects of the present disclosure.

FIG. 11 shows a block diagram 1100 of a base station communications manager 1105 that supports signaling of higher modulation order baseband capability in accordance with aspects of the present disclosure. The base station communications manager 1105 may be an example of aspects of a base station communications manager 915, a base station communications manager 1015, or a base station communications manager 1210 described herein. The base station communications manager 1105 may include a capability component 1110, a layer component 1115, a category identifier component 1120, a baseband capability component 1125, and a carrier aggregation component 1130. Each of these modules may communicate, directly or indirectly, with one another (e.g., via one or more buses).

The capability component 1110 may receive, from a UE in a connection establishment procedure, UE capability information 1140. The UE capability information 1140 may include a UE category identifier and a baseband capability parameter, the baseband capability parameter indicating a processing capability of the UE related to a number of layers, a modulation order, a data rate, or a combination thereof. In some examples, the capability component 1110 may receive, from a second UE in a second connection establishment procedure, second UE capability information including a second UE category identifier.

The layer component 1115 may determine, based on the baseband capability parameter, a set of layers and corresponding modulation orders for the set of layers for communication with the UE over one or more carriers. In some examples, the layer component 1115 may communicate with the UE over the one or more carriers over communications 1160 according to the set of layers and corresponding modulation orders. In some examples, the layer component 1115 may communicate with the second UE over the one or more carriers over communications 1160 according to the second set of layers and corresponding modulation orders. The communications 1160 may include the UE capability information 1140. The layer component 1115 may forward the UE capability information 1140 to the capability component 1110.

The category identifier component 1120 may identify the UE category identifier. In some examples, the UE category identifier may be associated with a range for a maximum data rate. In some other examples, the baseband capability parameter may include a maximum supported data rate within the range for the maximum data rate. The category identifier component 1120 may receive a UE category identifier signal 1145 from the capability component 1110.

The baseband capability component 1125 may identify the baseband capability parameter. The baseband capability component 1125 may receive a baseband capability parameter signal 1155 from the capability component 1110. In some examples, the baseband capability parameter signal 1155 identifies the baseband capability parameter, which includes a weighting factor for a first modulation order of a set of available modulation orders and a total number of supported layers. In some other examples, the baseband capability parameter includes a number of layers for which a first modulation order may be supported.

The carrier aggregation component 1130 may determine, based on one or more indicated carrier aggregation band combinations and numbers of supported layers for each composite carrier for the one or more indicated carrier aggregation band combinations, a second set of layers and corresponding modulation orders for the second set of layers for communication with the second UE over one or more carriers. In some examples, the UE capability information includes one or more carrier aggregation combination entries. The carrier aggregation component 1130 may receive one or more carrier aggregation combination entry signals 1135 from the capability component 1110. The one or more carrier aggregation combination entry signals 1135 may identify one or more carrier aggregation combination entries. In some other examples, each carrier aggregation combination entry may correspond to a unique combination of composite carrier band indicators and numbers of supported layers for each composite carrier band indicator. In other examples, each composite carrier band indicator may include a carrier band and band class.

The UE capability information 1140 may include a set of carrier aggregation combination entries. In some other examples, each carrier aggregation combination entry may be associated with a corresponding baseband capability parameter. In some examples, the UE capability information 1140 may include a first carrier aggregation combination entry associated with a first band combination including a first set of bands associated with a first protocol and a second set of bands associated with a second protocol. In some other examples, the first carrier aggregation combination entry may include a first baseband capability parameter associated with the first protocol and a second baseband capability parameter associated with the second protocol.

In some other examples, the UE capability information 1140 may include a second carrier aggregation combination entry associated with the first band combination, the first carrier aggregation combination entry may include a third baseband capability parameter associated with the first protocol and a fourth baseband capability parameter associated with the second protocol. In some examples, the first baseband capability parameter corresponds to a protocol dependent baseband support associated with the first protocol and the second baseband capability parameter corresponds to a maximum supported data rate, a weighting factor for a first modulation order of a set of available modulation orders and a total number of supported layers, or a number of layers for which the first modulation order is supported.

Figure 12:
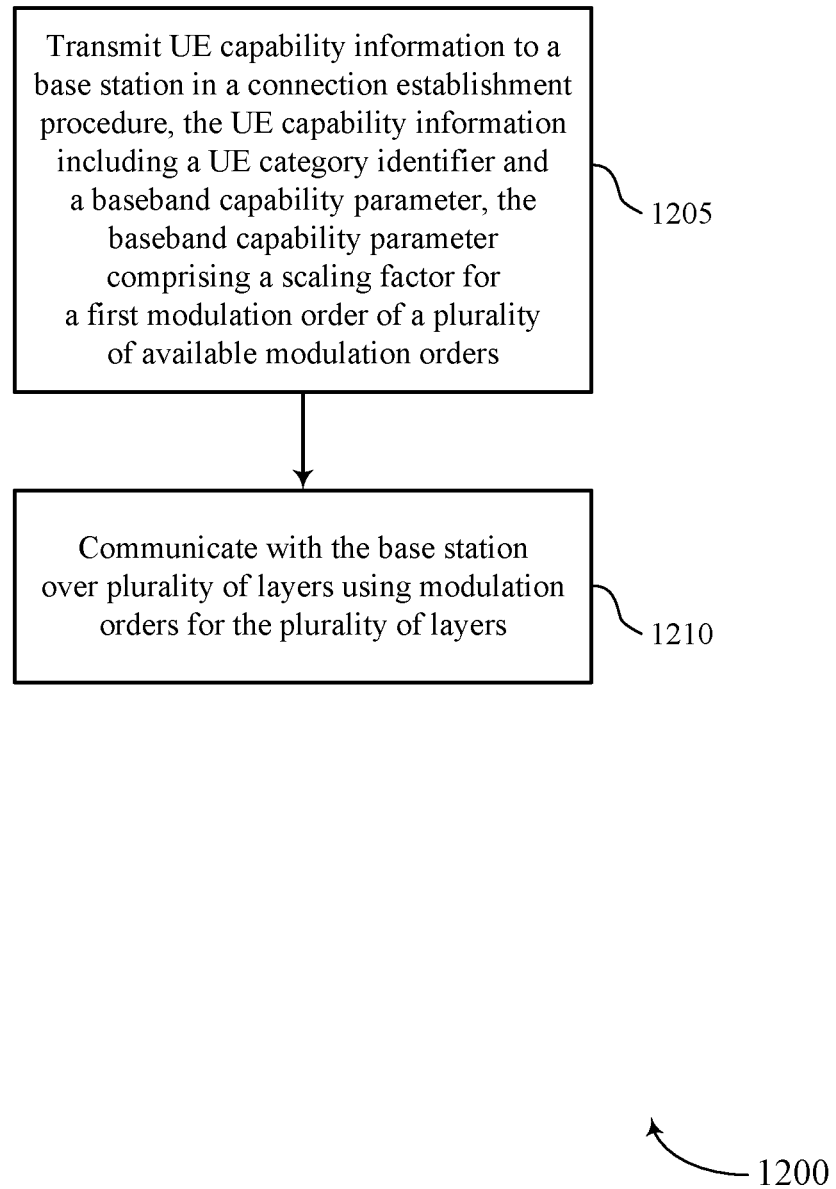
FIG. 12 shows a diagram of a system including a device that supports signaling of higher modulation order baseband capability in accordance with aspects of the present disclosure.

FIG. 12 shows a diagram of a system 1200 including a device 1205 that supports signaling of higher modulation order baseband capability in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may receive, from a UE in a connection establishment procedure, UE capability information including a UE category identifier and a baseband capability parameter, the baseband capability parameter indicating a processing capability of the UE related to a number of layers, a modulation order, a data rate, or a combination thereof, determine, based on the baseband capability parameter, a set of layers and corresponding modulation orders for the set of layers for communication with the UE over one or more carriers, and communicate with the UE over the layers using corresponding modulation orders. In some examples, the base station communications manager 1210 may communicate with the UE over the one or more carriers according to the set of layers (e.g., over one or more layers for each of the one or more carriers) and corresponding modulation orders.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting signaling of higher modulation order baseband capability).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
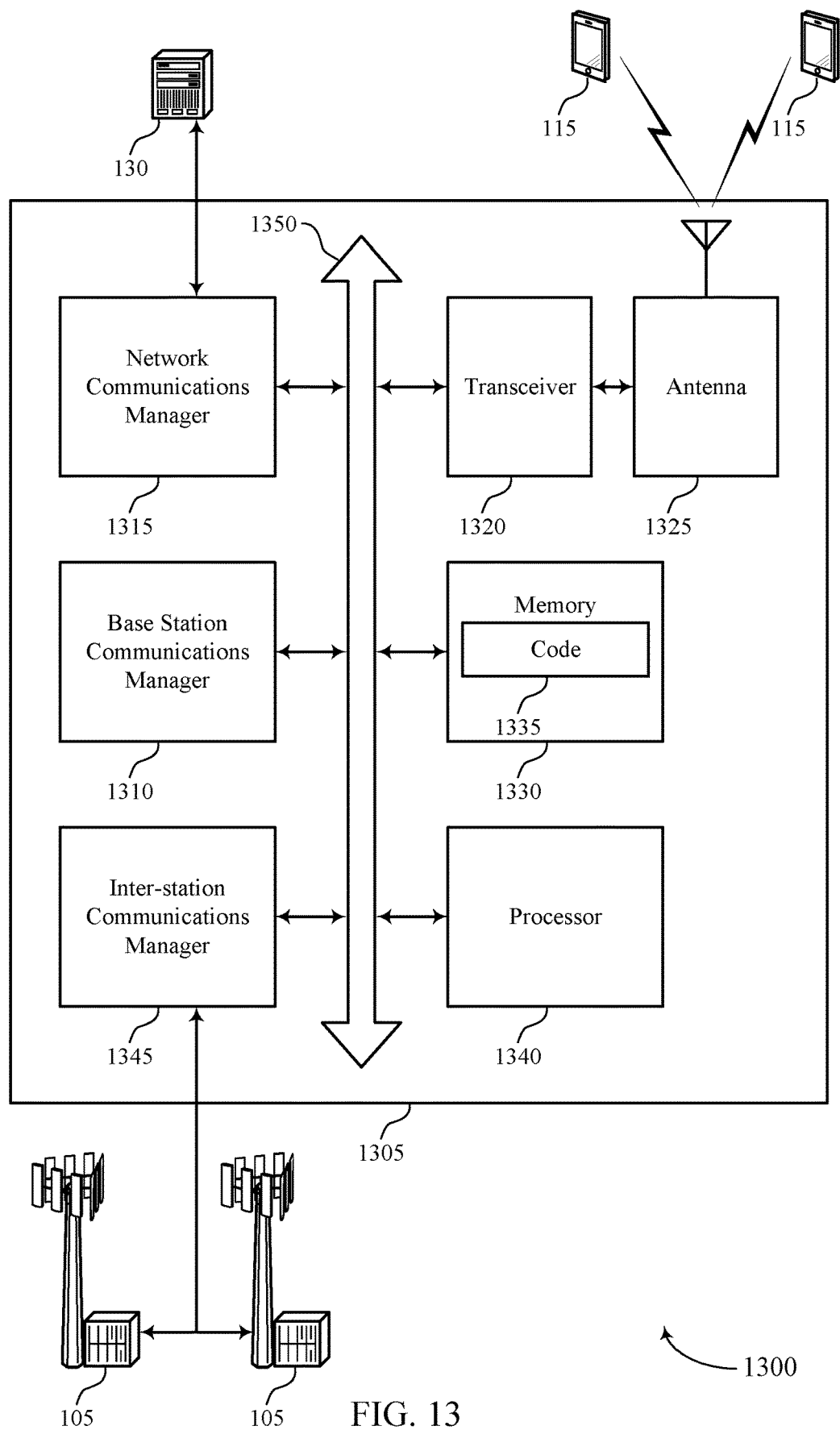
FIGS. 13 and 14 show flowcharts illustrating methods that support signaling of higher modulation order baseband capability in accordance with aspects of the present disclosure.

FIG. 13 shows a flowchart illustrating a method 1300 that supports signaling of higher modulation order baseband capability in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may transmit UE capability information to a base station in a connection establishment procedure, the UE capability information including a UE category identifier and a baseband capability parameter, the baseband capability parameter comprising a scaling factor for a first modulation order of a plurality of available modulation orders.

In some examples, the UE may include one or more carrier aggregation combination entries in the UE capability information. The baseband capability parameter may reduce the overhead for transmission of carrier aggregation combination entries. In some examples, each carrier aggregation combination entry may include a unique combination of composite carrier band indicators and numbers of supported layers for each component carrier for each composite carrier band indicator. That is, each carrier aggregation combination entry may not indicate a separate combination of support of higher order modulation (e.g., 1024QAM) for each composite carrier band indicator, and thus it may not be necessary to send, in the UE capability information, different carrier aggregation combination entries for the same combination of composite carrier band indicators with different numbers of supported layers and support for the higher order modulation per composite carrier band indicator. In some examples, each carrier aggregation combination entry may be associated with a corresponding baseband capability parameter.

The UE may transmit the UE capability information to the base station via RRC signaling. For example, the UE may transmit the UE capability information to the base station via RRC signaling, in response to a capability enquiry from the base station during the connection establishment procedure, such as an RRC connection establishment procedure. In some examples, the UE may transmit the UE capability information via RRC signaling on one or more of a PUCCH or a PUSCH during the connection establishment procedure. Accordingly, the base station may use the UE capability information.

In some examples, the baseband capability parameter further indicates a processing capability of the UE related to a number of layers, a data rate, or a combination thereof. In some examples, the baseband capability parameter comprises a first baseband capability parameter, x, and a second baseband capability parameter, y, where a 1024QAM capability of the UE is defined as:

$$x \cdot Num_{Layers,1024QAM} + Num_{Layers,non1024QAM} \leq y$$

where $Num_{Layers,1024QAM}$ comprises a total number of layers for 1024QAM across all component carriers supported by the UE and $Num_{Layers,non1024QAM}$ comprises a total number of downlink layers for other modulation orders across all carriers supported by the UE.

The operations of 1305 may be performed according to the methods described herein. In some examples, aspects of the operations of 1305 may be performed by a capability component as described with reference to FIGS. 5 through 8.

At 1310, the UE may communicate with the base station over a plurality of layers using corresponding modulation orders for the plurality of layers. For example, the UE may transmit, to the base station, control information (e.g., uplink control information (UCI)) or data over one or more carriers according to a set of layers and corresponding modulation orders for the set of layers. Alternatively, the UE may receive, from the base station, control information (e.g., downlink control information (DCI)) or data over one or more carriers according to a set of layers and corresponding modulation orders for the set of layers. The operations of 1310 may be performed according to the methods described herein. In some examples, aspects of the operations of 1310 may be performed by a layer component as described with reference to FIGS. 5 through 8.

Figure 14:
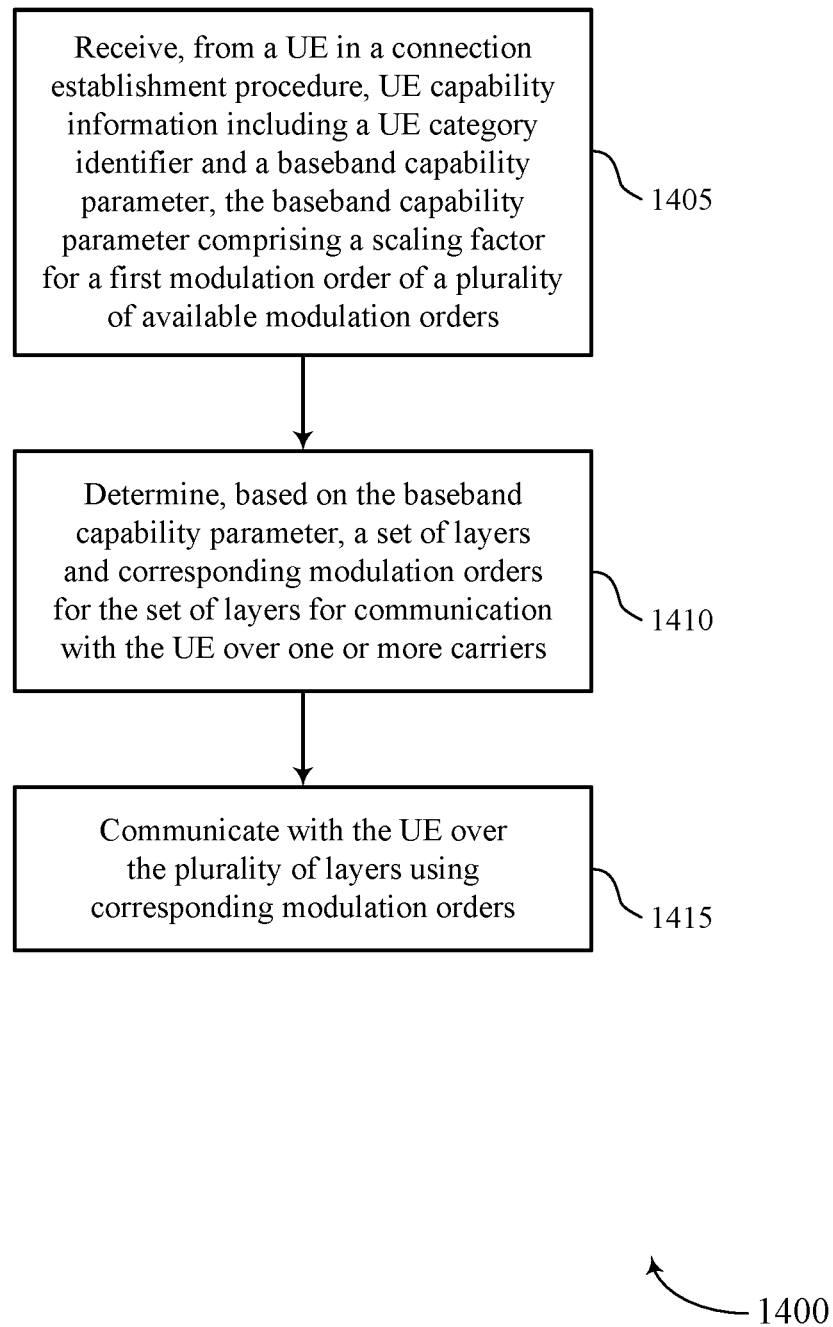

FIG. 14 shows a flowchart illustrating a method 1400 that supports signaling of higher modulation order baseband capability in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may receive, from a UE in a connection establishment procedure, UE capability information including a UE category identifier and a baseband capability parameter, the baseband capability parameter comprising a scaling factor for a first modulation order of a plurality of available modulation orders.

In some examples, the base station may identify one or more carrier aggregation combination entries in the UE capability information. The baseband capability parameter may reduce the overhead for transmission of carrier aggregation combination entries. In some examples, each carrier aggregation combination entry may include a unique combination of composite carrier band indicators and numbers of supported layers for each component carrier for each composite carrier band indicator. That is, each carrier aggregation combination entry may not indicate a separate combination of support of higher order modulation (e.g., 1024QAM) for each composite carrier band indicator, and thus it may not be necessary to send, in the UE capability information, different carrier aggregation combination entries for the same combination of composite carrier band indicators with different numbers of supported layers and support for the higher order modulation per composite carrier band indicator. In some examples, each carrier aggregation combination entry may be associated with a corresponding baseband capability parameter.

In some examples, the base station may receive the UE capability information from the UE via RRC signaling. For example, the base station may receive the UE capability information from the UE via RRC signaling during the connection establishment procedure, such as an RRC connection establishment procedure. In some examples, the UE may transmit the UE capability information on one or more of a PUCCH or a PUSCH.

In some examples, the baseband capability parameter further indicates a processing capability of the UE related to a number of layers, a data rate, or a combination thereof. In some examples, the baseband capability parameter comprises a first baseband capability parameter, x, and a second baseband capability parameter, y, where a 1024QAM capability of the UE is defined as:

$$x \cdot Num_{Layers,1024QAM} + Num_{Layers,non1024QAM} \leq y$$

where $Num_{Layers,1024QAM}$ comprises a total number of layers for 1024QAM across all component carriers supported by the UE and $Num_{Layers,non1024QAM}$ comprises a total number of downlink layers for other modulation orders across all carriers supported by the UE.

The operations of 1405 may be performed according to the methods described herein. In some examples, aspects of the operations of 1405 may be performed by a capability component as described with reference to FIGS. 9 through 12.

At 1410, the base station may determine, based on the baseband capability parameter, a set of layers and corresponding modulation orders for the set of layers for communication with the UE over one or more carriers. For example, the base station may determine a carrier aggregation configuration for the UE based on the UE capability information. The carrier configuration may be based on a carrier aggregation combination entry from the set of carrier aggregation combination entries included in the UE capability information. The base station may apply a modulation order, to one or more carriers associated with the carrier aggregation configuration, such that the baseband capability parameter is satisfied. The operations of 1410 may be performed according to the methods described herein. In some examples, aspects of the operations of 1410 may be performed by a layer component as described with reference to FIGS. 9 through 12.

At 1415, the base station may communicate with the UE over the set of layers (e.g., over one or more layers for each of the one or more carriers) using corresponding modulation orders. In some examples, the base station may transmit, to the UE, control information (e.g., DCI) or data over one or more carriers according to a set of layers and corresponding modulation orders for the set of layers. For example, the base station may transmit, to the UE, the control information (e.g., DCI) or data over the one or more carriers associated with the carrier aggregation combination entry. Alternatively, the base station may receive, from the UE, control information (e.g., UCI) or data over one or more carriers according to a set of layers and corresponding modulation orders for the set of layers. The operations of 1415 may be performed according to the methods described herein. In some examples, aspects of the operations of 1415 may be performed by a layer component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. For example, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting UE capability information to an access network entity in a connection establishment procedure, the UE capability information comprising a UE category identifier and a baseband capability parameter, the baseband capability parameter indicating a scaling factor for a first modulation order of a plurality of available modulation orders and comprising a total number of supported layers; and
    communicating with the access network entity over a plurality of layers using corresponding modulation orders for the plurality of layers, wherein the communicating comprises communicating over a first number of layers using the first modulation order and a second number of layers using other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor.

2. The method of claim 1, wherein the UE category identifier is associated with a range for a maximum data rate, and wherein the baseband capability parameter further comprises a maximum supported data rate within the range for the maximum data rate.

3. A method for wireless communications at a user equipment (UE), comprising:
    transmitting UE capability information to an access network entity in a connection establishment procedure, the UE capability information comprising a UE category identifier and a baseband capability parameter, the baseband capability parameter indicating a scaling factor for a first modulation order of a plurality of available modulation orders, and wherein the baseband capability parameter comprises the scaling factor, x, and a total number of supported layers, y, and wherein a capability of the UE is given by:

$$x \cdot Num_{Layers,1024QAM} + Num_{Layers,non1024QAM} \leq y$$

where $Num_{Layers,1024QAM}$ comprises a total number of layers for 1024QAM across all component carriers supported by the UE and $NUM_{Layers,non1024QAM}$ comprises a total number of downlink layers for other modulation orders across all carriers supported by the UE; and
    communicating with the access network entity over a plurality of layers using corresponding modulation orders for the plurality of layers.

4. The method of claim 1, wherein the baseband capability parameter further comprises a number of layers for which the first modulation order is supported.

5. The method of claim 1, wherein the UE capability information comprises one or more carrier aggregation combination entries, and wherein each carrier aggregation combination entry corresponds to a unique combination of composite carrier band indicators and numbers of supported layers for each component carrier for each composite carrier band indicator, and wherein each composite carrier band indicator comprises a carrier band and band class.

6. The method of claim 1, wherein the UE capability information comprises a set of carrier aggregation combination entries, and wherein each carrier aggregation combination entry is associated with a corresponding baseband capability parameter.

7. The method of claim 1, wherein the UE capability information comprises a first carrier aggregation combination entry associated with a first band combination including a first set of bands associated with a first protocol and a second set of bands associated with a second protocol, the first carrier aggregation combination entry including a first baseband capability parameter associated with the first protocol.

8. The method of claim 7, wherein the first baseband capability parameter associated with the first protocol corresponds to a total number of weighted layers supported at the UE for the first protocol.

9. A method for wireless communications at an access network entity, comprising:
receiving, from a user equipment (UE) in a connection establishment procedure, UE capability information comprising a UE category identifier and a baseband capability parameter, the baseband capability parameter indicating a scaling factor for a first modulation order of a plurality of available modulation orders and comprising a total number of supported layers;
determining, based at least in part on the baseband capability parameter, a plurality of layers and corresponding modulation orders for the plurality of layers for communication with the UE over one or more carriers; and
communicating with the UE over the plurality of layers using the corresponding modulation orders, wherein the communicating comprises communicating over a first number of layers using the first modulation order and a second number of layers using other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor.

10. The method of claim 9, wherein the UE category identifier is associated with a range for a maximum data rate, and wherein the baseband capability parameter further comprises a maximum supported data rate within the range for the maximum data rate.

11. The method of claim 9, wherein the baseband capability parameter further comprises the total number of supported layers.

12. The method of claim 9, wherein the baseband capability parameter further comprises a number of layers for which the first modulation order is supported.

13. The method of claim 9, wherein the UE capability information comprises one or more carrier aggregation combination entries, and wherein each carrier aggregation combination entry corresponds to a unique combination of composite carrier band indicators and numbers of supported layers for each composite carrier band indicator, and wherein each composite carrier band indicator comprises a carrier band and band class.

14. The method of claim 9, wherein the UE capability information comprises a set of carrier aggregation combination entries, and wherein each carrier aggregation combination entry is associated with a corresponding baseband capability parameter.

15. The method of claim 9, wherein the UE capability information comprises a first carrier aggregation combination entry associated with a first band combination including a first set of bands associated with a first protocol and a second set of bands associated with a second protocol, the first carrier aggregation combination entry including a first baseband capability parameter associated with the first protocol.

16. The method of claim 15, wherein the first baseband capability parameter associated with the first protocol corresponds to a total number of weighted layers supported at the UE for the first protocol.

17. The method of claim 9, further comprising:
receiving, from a second UE in a second connection establishment procedure, second UE capability information comprising a second UE category identifier;
determining, based at least in part on one or more indicated carrier aggregation band combinations and numbers of supported layers for each composite carrier for the one or more indicated carrier aggregation band combinations, a second plurality of layers and corresponding modulation orders for the second plurality of layers for communication with the second UE over one or more carriers; and
communicating with the second UE over the one or more carriers according to the second plurality of layers and corresponding modulation orders.

18. A method for wireless communications at an access network entity, comprising:
receiving, from a user equipment (UE) in a connection establishment procedure, UE capability information comprising a UE category identifier and a baseband capability parameter, wherein the baseband capability parameter comprises the scaling factor, x, and a total number of supported layers, y, and wherein a capability of the UE is given by:

$$x \cdot Num_{Layers, 1024QAM} + Num_{Layers, non1024QAM} \leq y$$

where $Num_{Layers,1024QAM}$ comprises a total number of layers for 1024QAM across all component carriers supported by the UE and $Num_{Layers,non1024QAM}$ comprises a total number of downlink layers for other modulation orders across all carriers supported by the UE;
determining, based at least in part on the baseband capability parameter, a plurality of layers and corresponding modulation orders for the plurality of layers for communication with the UE over one or more carriers; and
communicating with the UE over the plurality of layers using the corresponding modulation orders.

19. An apparatus for wireless communications, comprising:
a processor,
memory in electronic communication with the processor; and
instructions stored in the memory and executable by the processor to cause the apparatus to:
transmit user equipment (UE) UE capability information to an access network entity in a connection establishment procedure, the UE capability information comprising a UE category identifier and a baseband capability parameter, the baseband capability parameter indicating a scaling factor for a first modulation order of a plurality of available modulation orders and comprising a total number of supported layers; and communicate with the access network entity over a plurality of layers using corresponding modulation orders for the plurality of layers, wherein the communicating comprises communicating over a first number of layers using the first modulation order and a second number of layers using other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor.

20. The apparatus of claim 19, wherein the UE category identifier is associated with a range for a maximum data rate, and wherein the baseband capability parameter further comprises a maximum supported data rate within the range for the maximum data rate.

21. An apparatus for wireless communications, comprising:

a processor, memory in electronic communication with the processor; and instructions stored in the memory and executable by the processor to cause the apparatus to:

transmit user equipment (UE) capability information to an access network entity in a connection establishment procedure, the UE capability information comprising a UE category identifier and a baseband capability parameter, the baseband capability parameter indicating a scaling factor for a first modulation order of a plurality of available modulation orders, and wherein the baseband capability parameter comprises the scaling factor, x, and a total number of supported layers, y, and wherein a capability of the UE is given by:

$$x \cdot Num_{Layers,1024QAM} + Num_{Layers,non1024QAM} \leq y$$

where $Num_{Layers,1024QAM}$ comprises a total number of layers for 1024QAM across all component carriers supported by the UE and $Num_{Layers,non1024QAM}$ comprises a total number of downlink layers for other modulation orders across all carriers supported by the UE; and communicate with the access network entity over a plurality of layers using corresponding modulation orders for the plurality of layers.

22. An apparatus for wireless communications at an access network entity, comprising:

a processor, memory in electronic communication with the processor; and instructions stored in the memory and executable by the processor to cause the apparatus to:

receive, from a user equipment (UE) in a connection establishment procedure, UE capability information comprising a UE category identifier and a baseband capability parameter, the baseband capability parameter indicating a scaling factor for a first modulation order of a plurality of available modulation orders and comprising a total number of supported layers;

determine, based at least in part on the baseband capability parameter, a plurality of layers and corresponding modulation orders for the plurality of layers for communication with the UE over one or more carriers; and communicate with the UE over the plurality of layers using the corresponding modulation orders, wherein the communicating comprises communicating over a first number of layers using the first modulation order and a second number of layers using other modulation orders of the plurality of available modulation orders, wherein a sum of a first number of scaled layers of the first modulation order and the second number of layers is less than or equal to the total number of supported layers, and wherein the first number of scaled layers of the first modulation order is equal to the first number of layers of the first modulation order multiplied by the scaling factor.

23. An apparatus for wireless communications at an access network entity, comprising:

a processor, memory in electronic communication with the processor; and instructions stored in the memory and executable by the processor to cause the apparatus to:

receive, from a user equipment (UE) in a connection establishment procedure, UE capability information comprising a UE category identifier and a baseband capability parameter, wherein the baseband capability parameter comprises the scaling factor, x, and a total number of supported layers, y, and wherein a capability of the UE is given by:

$$x \cdot Num_{Layers,1024QAM} + Num_{Layers,non1024QAM} \leq y$$

where $Num_{Layers,1024QAM}$ comprises a total number of layers for 1024QAM across all component carriers supported by the UE and $Num_{Layers,non1024QAM}$ comprises a total number of downlink layers for other modulation orders across all carriers supported by the UE;

determine, based at least in part on the baseband capability parameter, a plurality of layers and corresponding modulation orders for the plurality of layers for communication with the UE over one or more carriers; and communicate with the UE over the plurality of layers using the corresponding modulation orders.

* * * * *